US010996683B2

(12) United States Patent
O'Flaherty et al.

(10) Patent No.: US 10,996,683 B2
(45) Date of Patent: May 4, 2021

(54) AERIAL VEHICLE TOUCHDOWN DETECTION

(71) Applicant: Skydio, Inc., Redwood City, CA (US)

(72) Inventors: Rowland Wilde O'Flaherty, Chicago, IL (US); Teodor Tomic, Redwood City, CA (US); Hayk Martirosyan, San Francisco, CA (US); Abraham Galton Bachrach, Redwood City, CA (US); Kristen Marie Holtz, Redwood City, CA (US); Jack Louis Zhu, Redwood City, CA (US)

(73) Assignee: Skydio, Inc., Redwood City, CA (US)

(*) Notice: Subject to any disclaimer, the term of this patent is extended or adjusted under 35 U.S.C. 154(b) by 163 days.

(21) Appl. No.: 16/272,132

(22) Filed: Feb. 11, 2019

(65) Prior Publication Data
US 2019/0250640 A1    Aug. 15, 2019

Related U.S. Application Data

(60) Provisional application No. 62/628,876, filed on Feb. 9, 2018.

(51) Int. Cl.
G05D 1/04    (2006.01)
G05D 1/06    (2006.01)
(Continued)

(52) U.S. Cl.
CPC .......... *G05D 1/042* (2013.01); *B64C 39/024* (2013.01); *G06N 20/00* (2019.01); *B64C 2201/141* (2013.01); *B64C 2201/18* (2013.01)

(58) Field of Classification Search
CPC ... G05D 1/04; G05D 1/00; G05D 1/06; B64C 29/00; B64C 15/00; B64C 39/02; B64F 1/36; B64F 5/02; B60L 11/18
See application file for complete search history.

(56) References Cited

U.S. PATENT DOCUMENTS 6,604,706 B1 *  8/2003  Bostan .................... B64C 17/06
                                                        244/17.11
9,511,878 B1   12/2016  Mcdermott et al.
(Continued)

FOREIGN PATENT DOCUMENTS

WO    2017206384 A1    12/2017

OTHER PUBLICATIONS

International Search Report and Written Opinion dated Apr. 30, 2019, for International Application No. PCT/US19/17526, 13 pages.
(Continued)

*Primary Examiner* — Yuri Kan

(57) ABSTRACT

A technique is introduced for touchdown detection during autonomous landing by an aerial vehicle. In some embodiments, the introduced technique includes processing perception inputs with a dynamics model of the aerial vehicle to estimate the external forces and/or torques acting on the aerial vehicle. The estimated external forces and/or torques are continually monitored while the aerial vehicle is landing to determine when the aerial vehicle is sufficiently supported by a landing surface. In some embodiments, semantic information associated with objects in the environment is utilized to configure parameters associated with the touchdown detection process.

35 Claims, 24 Drawing Sheets

(51) Int. Cl.
  *G06N 20/00* (2019.01)
  *B64C 39/02* (2006.01)

(56) References Cited

U.S. PATENT DOCUMENTS

| | | | | |
|---|---|---|---|---|
| 9,630,713 | B1* | 4/2017 | Von Novak, III | B64C 25/52 |
| 2006/0231675 | A1* | 10/2006 | Bostan | B64C 29/02 |
| | | | | 244/12.1 |
| 2015/0153740 | A1 | 6/2015 | Ben-shachar et al. | |
| 2016/0039300 | A1* | 2/2016 | Wang | B60L 53/80 |
| | | | | 244/39 |
| 2016/0039541 | A1* | 2/2016 | Beardsley | B64C 39/024 |
| | | | | 701/2 |
| 2016/0063009 | A1 | 3/2016 | Charania et al. | |
| 2017/0075360 | A1* | 3/2017 | Von Novak | B64C 27/08 |
| 2017/0158327 | A1* | 6/2017 | Willford | G05D 1/0858 |
| 2017/0355453 | A1 | 12/2017 | Kim et al. | |
| 2018/0056743 | A1* | 3/2018 | Zhou | B64D 27/20 |
| 2018/0059665 | A1* | 3/2018 | Shin | B64D 47/08 |
| 2019/0041871 | A1* | 2/2019 | Wang | G05D 1/0669 |

OTHER PUBLICATIONS

Takahasi, M. D., et al., "Evaluation of Safe Landing Area Determination Algorithms for Autonomous Rotorcraft Using Site Benchmarking", American Helicopter Society, 67th Annual Forum, Virginia Beach, VA, May 3-5, 2011, https://vtol.org/store/product/evaluation-of-safe-landing-area-determination-algorithms-for-autonomous-rotorcraft-using -site-benchmarking-5327.cfm , May 3-5, 2011 , pp. 1-30.

\* cited by examiner

AERIAL VEHICLE TOUCHDOWN DETECTION

CROSS-REFERENCE TO RELATED APPLICATION(S)

This application is entitled to the benefit and/or right of priority of U.S. Provisional Application No. 62/628,876, titled, "UNMANNED AERIAL VEHICLE TOUCHDOWN DETECTION," filed Feb. 9, 2018, the contents of which are hereby incorporated by reference in their entirety for all purposes. This application is therefore entitled to a priority date of Feb. 9, 2018.

TECHNICAL FIELD

The present disclosure generally relates to autonomous vehicle technology.

BACKGROUND

Vehicles can be configured to autonomously navigate a physical environment. For example, an autonomous vehicle with various onboard sensors can be configured to generate perception inputs based on the surrounding physical environment that are then used to estimate a position and/or orientation of the autonomous vehicle within the physical environment. An autonomous navigation system can then utilize these position and/or orientation estimates to guide the autonomous vehicle through the physical environment.

DETAILED DESCRIPTION

Overview

A critical stage of any unmanned aerial vehicle (UAV) flight is the transition which takes place at takeoff and landing (planned or unplanned). Takeoff typically involves a straightforward process of the UAV powering up its propulsion system until the propulsion system outputs enough thrust to counter the force of gravity (i.e., the UAV's weight) and then proceeding with the rest of the flight. Landing can be more complex, however. When landing, the UAV must lower the thrust output from the propulsion system thereby causing the UAV to descend towards a landing surface such as the ground. At some point during the descent, the UAV must determine that it is sufficiently supported by a landing surface and that it is safe to power down the propulsion system. In addition, the approach to the landing surface should be performed at a safe speed to avoid damage to the UAV itself upon contact with the landing surface, allow for corrective maneuvers, avoid inadvertent collisions with other objects in the area, and avoid causing alarm or stress to people in the immediate area. Ideally, the UAV will touchdown with the velocity approaching zero to avoid causing any damage to the vehicle or other objects in the surrounding area.

As autonomous UAVs become more ubiquitous as consumer products, the landing phase becomes even more important because the UAV is often performing autonomous maneuvers in close proximity to people or animals. Furthermore, with the operation of UAVs being completely autonomous, the decision on when to correctly power down the propulsion system has to be made entirely without human involvement. For the UAV to correctly and autonomously decide it can power down, it needs a clear signal that is sufficiently supported by a landing surface. Obtaining this signal presents a challenge that is further pronounced by the fact the UAV may be configured to touchdown as gently as possible.

To address the challenges of detecting touchdown, a technique is introduced that utilizes information from various sensors onboard the UAV with a dynamics model of the UAV to estimate external forces and/or torques acting on the UAV without the need for tactile force sensors. In some embodiments, the introduced technique can enable an autonomous UAV to land on multiple types of surfaces (e.g., flat, sloped, even or rough, moving, etc.) and allow for a person to directly grab the UAV out of the air during the landing phase. In addition, the introduced technique may enable a UAV to recover and proceed with the landing if it encounters an obstacle or if it is bumped, jostled, moved, blown, hit, dropped (temporarily grabbed), etc. during the landing phase.

Example Implementation of an Unmanned Aerial Vehicle

Figure 1:
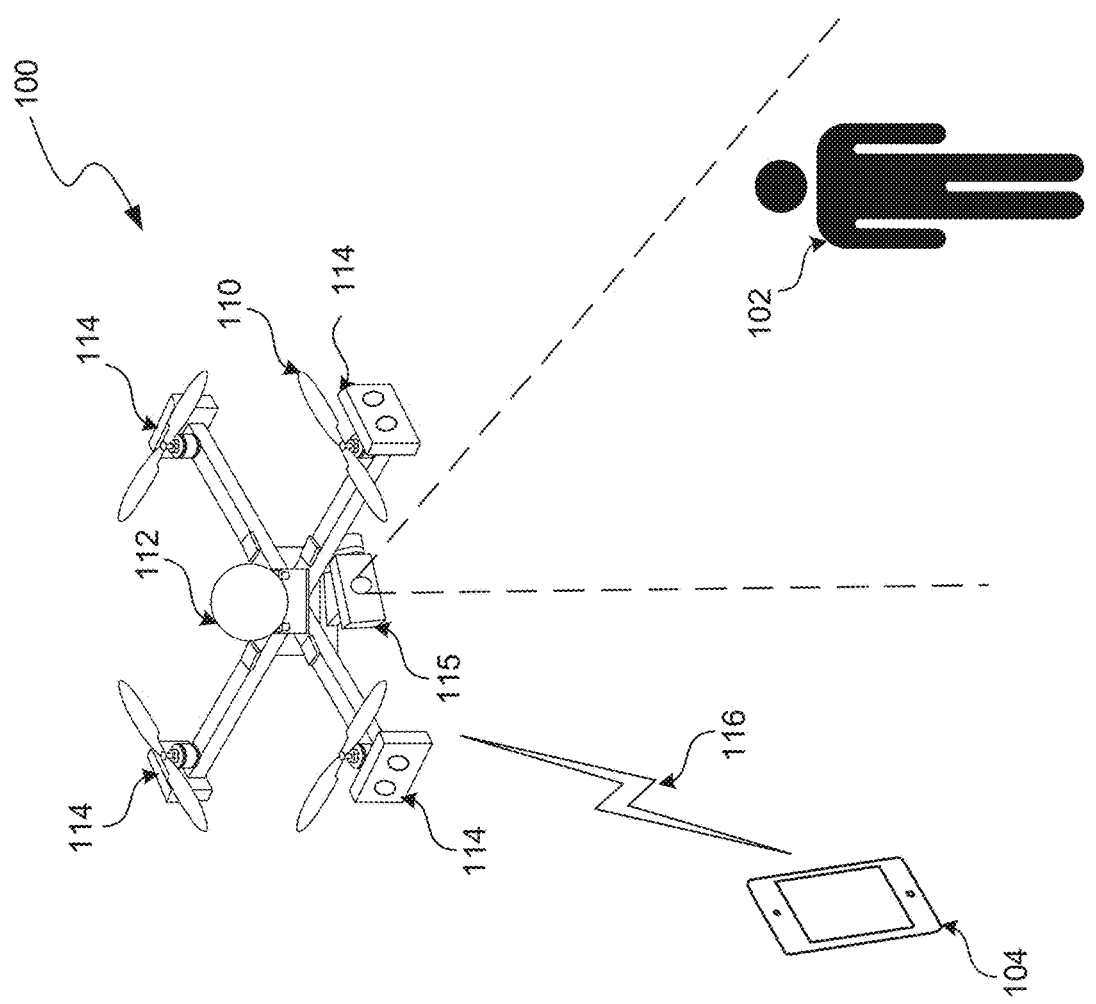
FIG. 1 shows an example configuration of an autonomous vehicle in the form of an unmanned aerial vehicle (UAV) within which certain techniques described herein may be applied.

FIG. 1 shows an example configuration of a UAV 100 within which certain techniques described herein may be applied. As shown in FIG. 1, UAV 100 may be configured as a rotor-based aircraft (e.g., a "quadcopter"), although the other introduced technique can similarly be applied in other types of UAV such as fixed-wing aircraft. The example UAV 100 includes control actuators 110 for maintaining controlled flight. The control actuators 110 may comprise or be associated with a propulsion system (e.g., rotors) and/or one or more control surfaces (e.g., flaps, ailerons, rudder, etc.) depending on the configuration of the UAV. The example UAV 100 depicted in FIG. 1 include control actuators 110 in the form of electronic rotors that comprise a propulsion system of the UAV 100. The UAV 100 also includes various sensors for automated navigation and flight control 112, and one or more image capture devices 114 and 115 for capturing images of the surrounding physical environment while in flight. "Images," in this context, include both still images and captured video. Although not shown in FIG. 1, UAV 100 may also include other sensors (e.g., for capturing audio) and systems for communicating with other devices, such as a mobile device 104, via a wireless communication channel 116.

In the example depicted in FIG. 1, the image capture devices 114 and/or 115 are depicted capturing an object 102 in the physical environment that happens to be a person. In some cases, the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices. While in flight, UAV 100 can also capture images using any one or more image capture devices that can be displayed in real time and or recorded for later display at other devices (e.g., mobile device 104).

FIG. 1 shows an example configuration of a UAV 100 with multiple image capture devices configured for different purposes. In the example configuration shown in FIG. 1, the UAV 100 includes multiple image capture devices 114 arranged about a perimeter of the UAV 100. The image capture device 114 may be configured to capture images for use by a visual navigation system in guiding autonomous flight by the UAV 100 and/or a tracking system for tracking other objects in the physical environment (e.g., as described with respect to FIG. 2). Specifically, the example configuration of UAV 100 depicted in FIG. 1 includes an array of multiple stereoscopic image capture devices 114 placed around a perimeter of the UAV 100 so as to provide stereoscopic image capture up to a full 360 degrees around the UAV 100.

In addition to the array of image capture devices 114, the UAV 100 depicted in FIG. 1 also includes another image capture device 115 configured to capture images that are to be displayed, but not necessarily used, for navigation. In some embodiments, the image capture device 115 may be similar to the image capture devices 114, except in how captured images are utilized. However, in other embodiments, the image capture devices 115 and 114 may be configured differently to suit their respective roles.

In many cases, it is generally preferable to capture images that are intended to be viewed at as high a resolution as possible given certain hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., 3840×2160 or higher) color images, while the image capture devices 114 may be configured to capture relatively low resolution (e.g., 320×240 or lower) grayscale images.

The UAV 100 can be configured to track one or more objects such as a human subject 102 through the physical environment based on images received via the image capture devices 114 and/or 115. Further, the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 so as to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

Mobile device 104 may include any type of mobile device such as a laptop computer, a table computer (e.g., Apple iPad™), a cellular telephone, a smart phone (e.g., Apple iPhone™), a handled gaming device (e.g., Nintendo Switch™), a single-function remote control device, or any other type of device capable of receiving user inputs, transmitting signals for delivery to the UAV 100 (e.g., based on the user inputs), and/or presenting information to the user (e.g., based on sensor data gathered by the UAV 100). In some embodiments, the mobile device 104 may include a touch screen display and an associated graphical user interface (GUI) for receiving user inputs and presenting information. In some embodiments, the mobile device 104 may include various sensors (e.g., an image capture device, accelerometer, gyroscope, GPS receiver, etc.) that can collect sensor data. In some embodiments, such sensor data can be communicated to the UAV 100, for example, for use by an onboard navigation system of the UAV 100.

Figure 2:
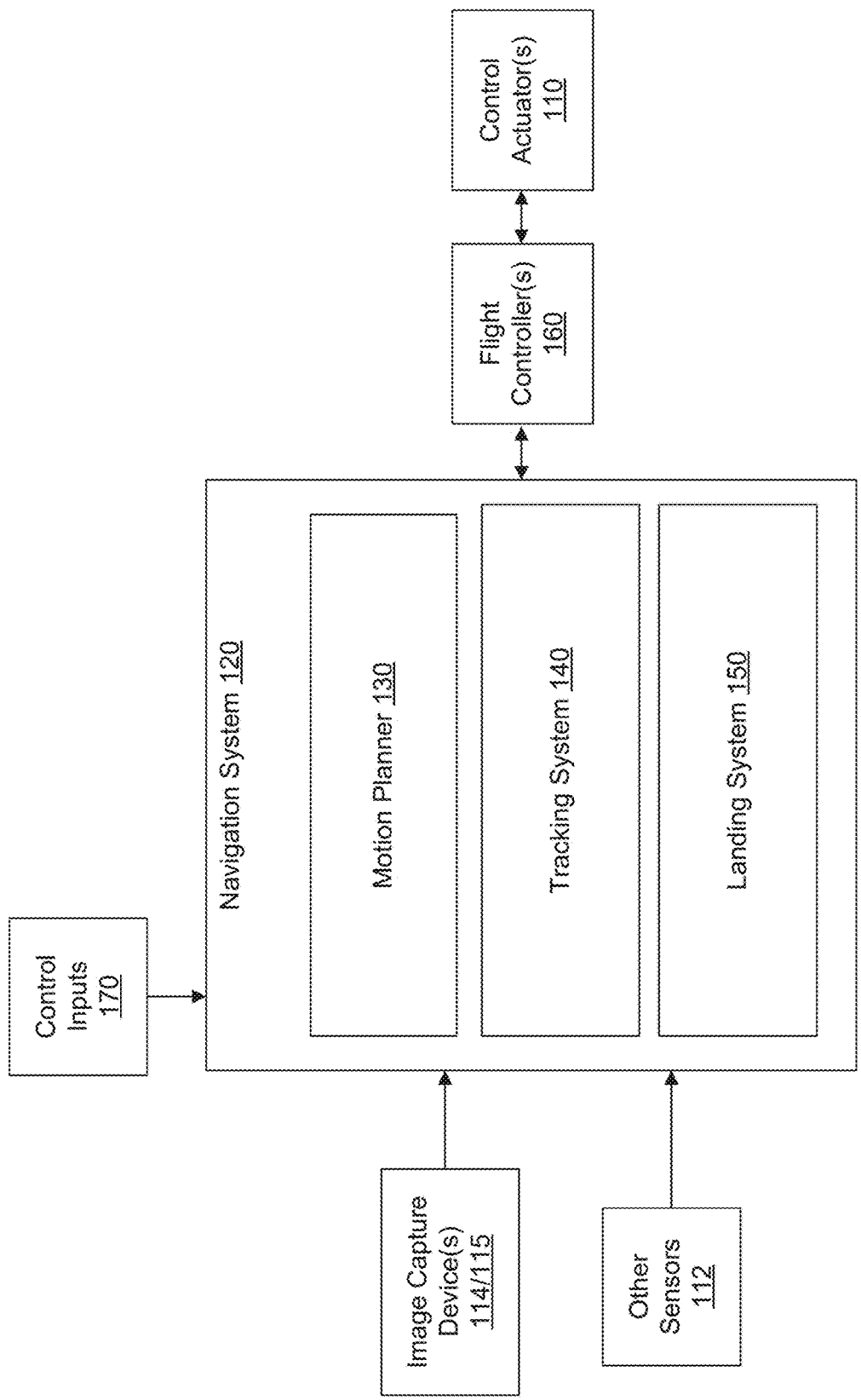
FIG. 2 shows a block diagram of an example navigation system that may be implemented with the UAV of FIG. 1.

FIG. 2 is a block diagram that illustrates an example navigation system 120 that may be implemented as part of the example UAV 100 described with respect to FIG. 1. The navigation system 120 may include any combination of hardware and/or software. For example, in some embodiments, the navigation system 120 and associated subsystems may be implemented as instructions stored in memory and executable by one or more processors.

As shown in FIG. 2, the example navigation system 120 includes a motion planner 130 (also referred to herein as a "motion planning system") for autonomously maneuvering the UAV 100 through a physical environment, a tracking system 140 for tracking one or more objects in the physical environment, and a landing system 150 for performing smart landing and the touchdown detection technique described herein. Note that the arrangement of systems shown in FIG. 2 is an example provided for illustrative purposes and is not to be construed as limiting. For example, in some embodiments, the tracking system 140 and/or landing system 150 may be separate from the navigation system 120. Further, the subsystems making up the navigation system 120 may not be logically separated as shown in FIG. 2 and instead may effectively operate as single integrated navigation system.

In some embodiments, the motion planner 130, operating separately or in conjunction with the tracking system 140, is configured to generate a planned trajectory through a three-dimensional (3D) space of a physical environment based, for example, on images received from image capture devices 114 and/or 115, data from other sensors 112 (e.g., IMU, GPS, proximity sensors, etc.), and/or one or more control inputs 170. Control inputs 170 may be from external sources such as a mobile device operated by a user or may be from other systems onboard the UAV.

In some embodiments, the navigation system 120 may generate control commands configured to cause the UAV 100 to maneuver along the planned trajectory generated by the motion planner 130. For example, the control commands may be configured to control one or more control actuators 110 (e.g., rotors and/or control surfaces) to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110.

The tracking system 140, operating separately or in conjunction with the motion planner 130, may be configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. Tracking objectives may include, for example, a designation by a user to track a particular detected object in the physical environment or a standing objective to track objects of a particular classification (e.g., people).

As alluded to above, the tracking system 140 may communicate with the motion planner 130, for example, to maneuver the UAV 100 based on measured, estimated, and/or predicted positions, orientations, and/or trajectories of objects in the physical environment. For example, the tracking system 140 may communicate a navigation objective to the motion planner 130 to maintain a particular separation distance to a tracked object that is in motion.

In some embodiments, the tracking system 140, operating separately or in conjunction with the motion planner 130, is further configured to generate control commands configured to cause a mechanism to adjust an orientation of any image capture devices 114/115 relative to the body of the UAV 100 based on the tracking of one or more objects. Such a mechanism may include a mechanical gimbal or a hybrid digital-mechanical gimbal, as previously described. For example, while tracking an object in motion relative to the UAV 100, the tracking system 140 may generate control commands configured to adjust an orientation of an image capture device 115 so as to keep the tracked object centered in the field of view (FOV) of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion.

The landing system 150, operating separately or in conjunction with the motion planner 130, may be configured to determine when to initiate a landing procedure (e.g., in response to a user command or a detected event such as low battery), identify a landing location (e.g., based on images received from image capture devices 114 and/or 115 and/or data from other sensors 112 (e.g., IMU, GPS, proximity sensors, etc.)) and generate control commands configured to cause the UAV to land at the selected location. Note that in some embodiments, the landing system 150 may be configured to generate an output in the form of a landing objective and input the landing objective into the motion planner 130 where that landing objective is utilized along with other objectives (e.g., avoiding collisions with objects) to autonomously land the UAV.

In some embodiments, a navigation system 120 (e.g., specifically a motion planning component 130) is configured to incorporate multiple objectives at any given time to generate an output such as a planned trajectory that can be used to guide the autonomous behavior of the UAV 100. For example, certain built-in objectives, such as obstacle avoidance and vehicle dynamic limits, can be combined with other input objectives (e.g., a landing objective) as part of a trajectory generation process. In some embodiments, the trajectory generation process can include gradient-based optimization, gradient-free optimization, sampling, end-to-end learning, or any combination thereof. The output of this trajectory generation process can be a planned trajectory over some time horizon (e.g., 10 seconds) that is configured to be interpreted and utilized by a flight controller 160 to generate control commands that cause the UAV 100 to maneuver according to the planned trajectory. A motion planner 130 may continually perform the trajectory generation process as new perception inputs (e.g., images or other sensor data) and objective inputs are received. Accordingly, the planned trajectory may be continually updated over some time horizon, thereby enabling the UAV 100 to dynamically and autonomously respond to changing conditions.

Figure 3A:
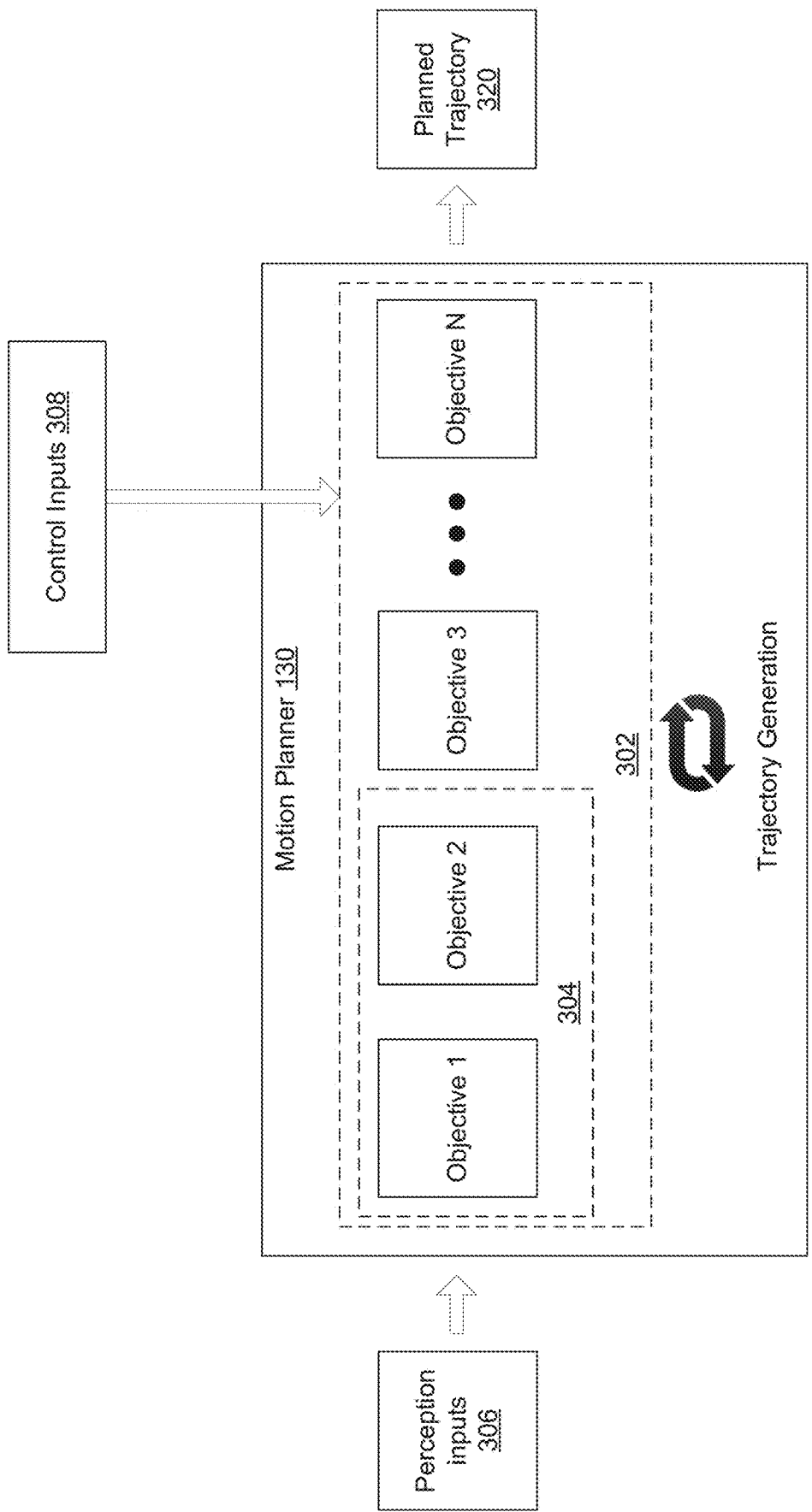
FIG. 3A shows a block diagram of an example motion planner that may be part of the navigation system of FIG. 2.

FIG. 3 shows a block diagram that illustrates an example system for objective-based motion planning. As shown in FIG. 3, a motion planner 130 (e.g., as discussed with respect to FIG. 2) may generate and continually update a planned trajectory 320 based on a trajectory generation process involving one or more objectives (e.g., as previously described) and/or more perception inputs 306. The perception inputs 306 may include images received from one or more image capture devices 114/115, results of processing such images (e.g., disparity images, depth values, semantic data, etc.), sensor data from one or more other sensors 112 onboard the UAV 100 or associated with other computing devices (e.g., mobile device 104) in communication with the UAV 100, and/or data generated by, or otherwise transmitted from, other systems onboard the UAV 100. The one or more objectives 302 utilized in the motion planning process may include built-in objectives governing high-level behavior (e.g., avoiding collision with other objects, the touchdown detection technique described herein, etc.) as well as objectives based on control inputs 308 (e.g., from users). Each of the objectives 302 may be encoded as one or more equations for incorporation in one or more motion planning equations utilized by the motion planner 130 when generating a planned trajectory to satisfy the one or more objectives. The control inputs 308 may be in the form of control commands from a user or from other components of the navigation system 120 such as a tracking system 140 and/or a landing system 150. In some embodiments, such inputs are received in the form of calls to an application programming interface (API) associated with the navigation system 120. In some embodiments, the control inputs 308 may include predefined objectives that are generated by other components of the navigation system 120 such as tracking system 140 or landing system 150.

Figure 3B:
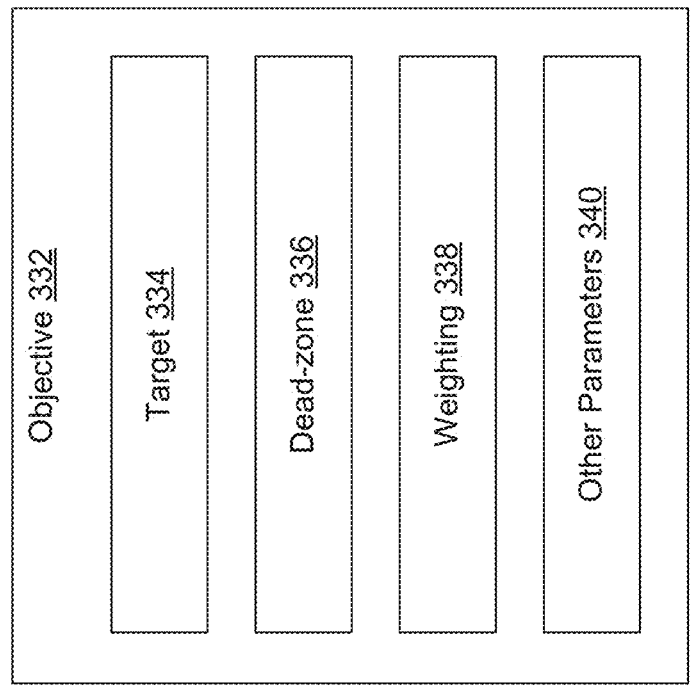
FIG. 3B shows a block diagram of representing an example objective that can be incorporated into the motion planner depicted in FIG. 3A.

Each given objective of the set of one or more objectives 302 utilized in the motion planning process may include one or more defined parameterizations that are exposed through the API. For example, FIG. 3B shows an example objective 332 that includes a target 334, a dead-zone 336, a weighting factor 338, and other parameters 3400.

The target 3344 defines the goal of the particular objective that the motion planner 130 will attempt to satisfy when generating a planned trajectory 320. For example, the target 334 of a given objective may be to maintain line of sight with one or more detected objects or to fly to a particular position in the physical environment.

The dead-zone defines a region around the target 334 in which the motion planner 130 may not take action to correct. This dead-zone 336 may be thought of as a tolerance level for satisfying a given target 334. For example, a target of an example image-relative objective may be to maintain image capture of a tracked object such that the tracked object appears at a particular position in the image space of a captured image (e.g., at the center). To avoid continuous adjustments based on slight deviations from this target, a dead-zone is defined to allow for some tolerance. For example, a dead-zone can be defined in a y-direction and x-direction surround a target location in the image space. In other words, as long as the tracked object appears within an area of the image bounded by the target and respective dead-zones, the objective is considered satisfied.

The weighting factor 336 (also referred to as an "aggressiveness" factor) defines a relative level of impact the particular objective 332 will have on the overall trajectory generation process performed by the motion planner 130. Recall that a particular objective 332 may be one of several objectives 302 that may include competing targets. In an ideal scenario, the motion planner 130 will generate a planner trajectory 320 that perfectly satisfies all of the relevant objectives at any given moment. For example, the motion planner 130 may generate a planned trajectory that maneuvers the UAV 100 to a particular GPS coordinate while following a tracked object, capturing images of the tracked object, maintaining line of sight with the tracked object, and avoiding collisions with other objects. In practice, such an ideal scenario may be rare. Accordingly, the motion planner system 130 may need to favor one objective over another when the satisfaction of both is impossible or impractical (for any number of reasons). The weighting factors for each of the objectives 302 define how they will be considered by the motion planner 130.

In an example embodiment, a weighting factor is numerical value on a scale of 0.0 to 1.0. A value of 0.0 for a particular objective may indicate that the motion planner 130 can completely ignore the objective (if necessary), while a value of 1.0 may indicate that the motion planner 130 will make a maximum effort to satisfy the objective while maintaining safe flight. A value of 0.0 may similarly be associated with an inactive objective and may be set to zero, for example, in response to toggling by an application 1210 of the objective from an active state to an inactive state. Low weighting factor values (e.g., 0.0-0.4) may be set for certain objectives that are based around subjective or aesthetic targets such as maintaining visual saliency in the captured images. Conversely, higher weighting factor values (e.g., 0.5-1.0) may be set for more critical objectives such as avoiding a collision with another object.

In some embodiments, the weighting factor values 338 may remain static as a planned trajectory is continually updated while the UAV 100 is in flight. Alternatively, or in addition, weighting factors for certain objectives may dynamically change based on changing conditions, while the UAV 100 is in flight. For example, an objective to avoid an area associated with uncertain depth value calculations in captured images (e.g., due to low light conditions) may have a variable weighting factor that increases or decreases based on other perceived threats to the safe operation of the UAV 100. In some embodiments, an objective may be associated with multiple weighting factor values that change depending on how the objective is to be applied. For example, a collision avoidance objective may utilize a different weighting factor depending on the class of a detected object that is to be avoided. As an illustrative example, the system may be configured to more heavily favor avoiding a collision with a person or animal as opposed to avoiding a collision with a building or tree.

The UAV 100 shown in FIG. 1 and the associated navigation system 120 shown in FIG. 2 are examples provided for illustrative purposes. A UAV 100, in accordance with the present teachings, may include more or fewer components than are shown. Further, the example UAV 100 depicted in FIG. 1 and associated navigation system 120 depicted in FIG. 2 may include or be part of one or more of the components of the example UAV system 2100 described with respect to FIG. 21 and/or the example computer processing system 2200 described with respect to FIG. 22. For example, the aforementioned navigation system 120 and associated motion planner 130, tracking system 140, and landing system 150 may include or be part of the UAV system 2100 and/or computer processing system 2200.

The introduced technique is described in the context of an unmanned aerial vehicle such as the UAV 100 depicted in FIG. 1 for illustrative simplicity; however, the introduced technique is not limited to this context. The introduced technique may similarly be applied to guide the landing of other types of aerial vehicles, such as manned rotor craft such as helicopters or a manned or unmanned fixed-wing aircraft. For example, a manned aircraft may include an autonomous navigation component (e.g., navigation system 120) in addition to a manual control (direct or indirect)

component. During a landing sequence, control of the craft may switch over from a manual control component to an automated control component where the introduced technique for touchdown detection is performed. Switchover from manual control to automated control may be executed in response to a pilot input and/or automatically in response to a detected event such as a remote signal, environmental conditions, operational state of the aircraft, etc.

Touch-Down Detection

The introduced technique for touchdown detection combines not only information from available sensors (e.g., inertial measurement unit, cameras, motors currents, GPS, and barometer) in an intelligent way, but also intelligently uses the sensor information with a dynamics model to estimate the amount and location of external forces and/or torques being applied to the UAV 100, without relying on tactile force sensors. The dynamics model may be based on the physical properties of the UAV 100 (e.g., dimensions, weight, materials, propulsion systems, aerodynamic characteristics, etc.), physical properties of the surrounding physical environment (e.g., air pressure, wind speed, etc.) and may be configured to reason how the UAV 100 will respond to certain motor commands. In other words, the introduced technique enables an autonomous UAV 100 to sense whether it is sufficiently supported by a landing surface, partially supported by a landing surface, sufficiently or partially supported by a dynamic landing surface such as a person's hand, supported by its own propulsion systems, in free fall, etc. Using this information, a landing system 150 associated with the autonomous UAV 100 can make decisions to respond accordingly with an objective of safely landing the UAV 100.

Figure 4:
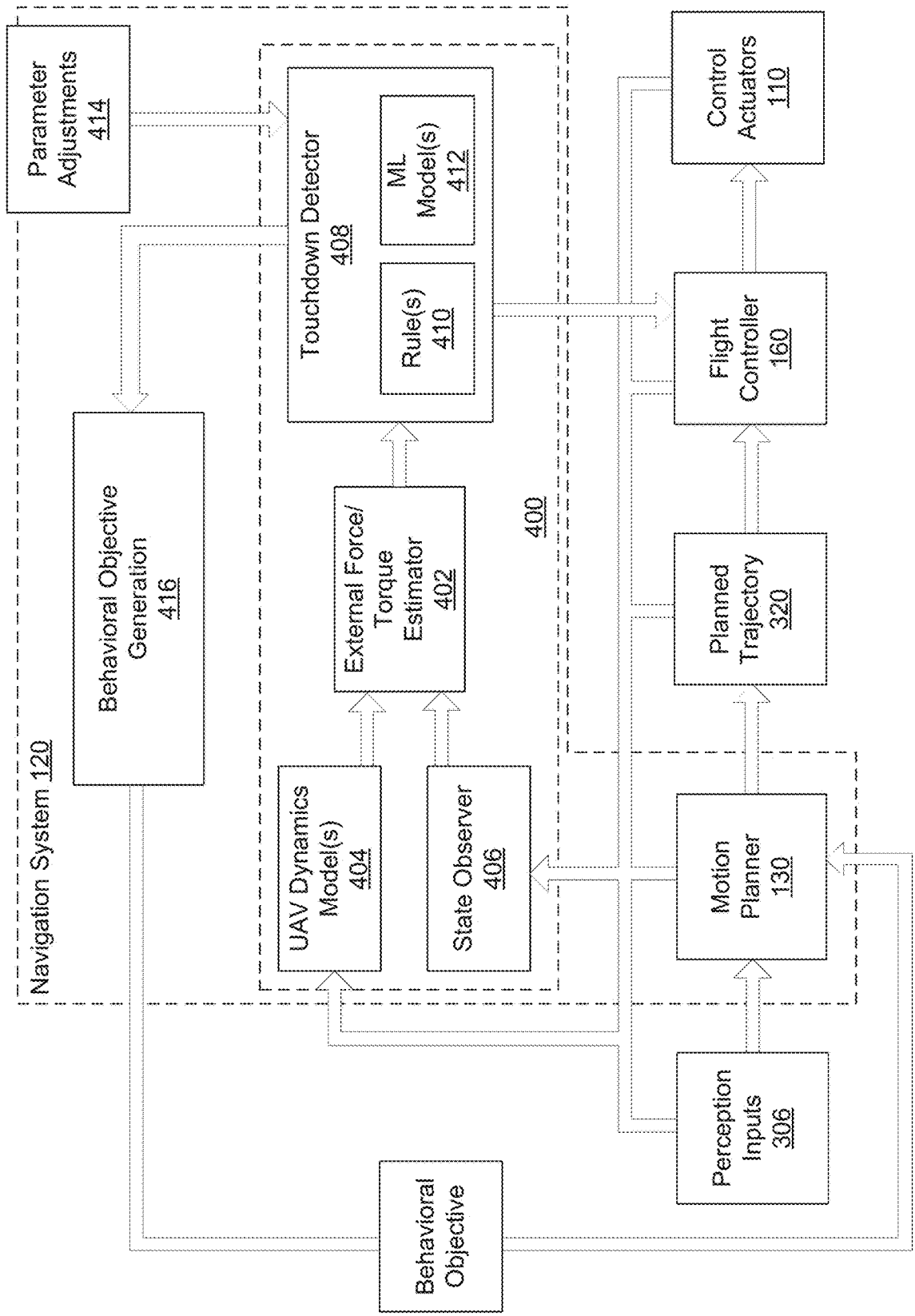
FIG. 4 is an architecture flow diagram of a system for touchdown detection that may be part of the navigation system of FIG. 2.

FIG. 4 shows an architecture flow diagram associated with an example touchdown detection system 400 in which the introduced technique may be implemented. As shown in FIG. 4, system 400 may include an external force/torque estimator module 402, one or more dynamics models of the UAV 404, a state observer 406, and a touchdown detector module 408. One or more of the components of the example system 400 may be part of the UAV's navigation system 120 (described previously with respect to FIG. 2) as indicated by the dotted line. In some embodiments, one or more components of example system 400 may be part of a subsystem of the navigation system 120 such as landing system 150. The various components of system 400 may include any combination of hardware and/or software. For example, in some embodiments, the various components of example system 400 and associated subsystems may be implemented as instructions stored in memory and executable by one or more processors.

As previously discussed, and with reference to FIGS. 2 and 3, an overall process for autonomous navigation of the UAV 100 may comprise a motion planner 130 processing perception inputs 306 (e.g., sensor data from one or more image capture devices 114/115 or other sensors 112) with one or more behavioral objectives to generate a planned trajectory 320 that is then fed into a flight controller 160, which then generates control commands for controlling one or more control actuators 110 to cause the UAV 100 to maneuver along the planned trajectory 320. Information associated with this control process flow can be fed into system 400 and processed, by an external force/torque estimator module 402, with one or more dynamics models 404 of the UAV 100 to generate estimates of the external forces and/or external torques that are acting on the body of the UAV 100 at any given time.

The information processed with the dynamics model 404 to generate estimates of the external forces and/or external torques acting on the UAV 100 may come from various sources. For illustrative simplicity this information is referred to herein as "perception inputs," but may not necessarily include all or the same information included in the perception inputs 306 that are processed by the motion planner 130. In some embodiments, the perception inputs may include sensor data received from one or more sensors onboard the UAV 100 such as image capture device 114/115 or other sensors 112. The other sensors 112 may include sensors specifically configured for sensing aspects of the surrounding physical environment (e.g., a pressure sensor), the motion/orientation of the UAV 100 (e.g., accelerometer, gyroscope, IMU, etc.), as well as various sensors coupled to other onboard systems such as the one or more control actuators 110 used for controlling the flight of the UAV 100. The perception inputs may also include the results of processing the sensor data such as state information (e.g., estimated position, velocity, etc. of the UAV 100) generated by a state observer 406, the planned trajectory 320, disparity images, semantic information, etc. In some embodiments, perception inputs may be based on information generated at the UAV 100 (e.g., from onboard sensors), but may also include information communicated to the UAV 100 from another device such as mobile device 104. Notably, in some embodiments, the perception inputs may not include data received from tactile force sensors since, as previously discussed, such sensors are not needed for performing the introduced technique. That being said, other embodiments may incorporate data from tactile force sensors to supplement the perception inputs.

As the UAV 100 is in flight, the external force/torque estimator module 402 may continually generate and update estimates of the external forces and/or external torques acting on the UAV 100, for example, by estimating the overall forces and/or torques based on the processing of the perception inputs with the dynamics model 404 and then subtracting certain forces that are known or inferred to be generated by the UAV 100 itself. For example, by processing the perception inputs (i.e., what the UAV 100 is experiencing) using a dynamics model 404, the external force/torque estimator 402 may estimate the forces needed (including magnitude, direction, location, etc.) to produce what the UAV is experiencing. The external force/torque estimator 402 may then subtract certain forces that are known or inferred to originate from the UAV 100. For example, by processing certain sensor data associated with control actuators 110, the external force/torque estimator 402 can estimate a thrust being applied by an onboard propulsion system. As an illustrative example, the external force/torque estimator 402 may estimate thrust being applied (including magnitude, direction, location, etc.) based on readings from current sensors coupled to each of the electronic motors powering rotors in the UAV's propulsion system.

The external force/torque estimator 402 may continually generate and update (e.g., every 1 millisecond) data that is indicative of the estimated external forces and/or external torques acting on the UAV 100 at any given time. This data, referred to herein as "force data," can then be output to the touchdown detector module 408 which processes the force data, for example, using one or more rules 401 and/or machine learning models 412 to generate decisions regarding the UAV's landing state such as whether the UAV 100 is in contact with a surface in the physical environment and/or whether the UAV 100 is sufficiently supported by the surface.

Rules 410 applied by the touchdown detector module 408 may set one or more threshold values for estimated external forces and/or torques that when met indicate that the UAV 100 is sufficiently supported by the surface in the physical environment. As just an illustrative example, a rule 410 may specify that the UAV 100 is sufficiently supported if the sum of the components of the estimated external forces in a y-direction are at least some threshold value. Actual rules implemented will likely be more complex to account for various situations including uneven landing surfaces, the structural arrangement of the UAV 100, wind conditions, etc.

Due to the complex and dynamic nature of the various external forces acting on the UAV 100, application of rules 410 may not result in accurate determinations in all situations, particularly when the landing conditions present many variables such as when the landing surface is uneven, when the landing surface is in motion, when contact force is unevenly distributed across the body of the UAV 100, etc. Accordingly, some embodiments may employ machine learning models 412 instead of, or in addition to, the rules 410. For example, a machine learning model 412 may be configured as a classifier that receives as input the force data from the external force/torque estimator module 402 and generates an output that places the state of the UAV 100 in one of several categories such as airborne and unsupported, airborne but in contact with a physical object, and sufficiently supported. In some embodiments, the machine learning model 412 may be configured as a support vector classifier, a neural network, or any other type of machine learning model. In some embodiments, the machine learning model 412 may be trained based on data from previous flights and landings by the UAV 100 and/or based on data from flights and landings by other UAV. The training process may be supervised or unsupervised. For example, in a supervised training process, a human input may indicate situations in which the UAV 100 was sufficiently supported by a landing surface and situations in which the UAV 100 was not sufficiently supported. Using the force data generated at such times, the machine learning model 412 may learn the conditions that indicate that the UAV 100 is sufficiently supported. Conditions learned by the machine learning model 412 may include external force/torque conditions as well as other state conditions such as velocity, angular velocity, orientation, etc.

The manner in which the rules 410 and/or machine learning models 412 are applied can depend on one or more parameter values such as certain thresholds or conditions in the case of rules 410, and machine learning parameters (e.g., weights, support vectors, coefficients, etc. in a neural network) and hyperparameters (e.g., number of layers, learning rate, etc. in a neural network) in the case of machine learning models 412. In some embodiments, certain parameters associated with the rules 410 and/or machine learning models 412 may be adjusted through parameter adjustment inputs 414 to achieve certain operational requirements. Parameter adjustments 414 may be based on user inputs (e.g., received via a mobile device 104), perception inputs, etc. For example, as will be described in more detail, in some embodiments, one or more parameters of a rule 410 or machine learning model 412 may be adjusted based on semantic information associated with the physical environment in which the UAV 100 is landing such as a type of landing surface, people or animals present, etc. Parameter adjustments 414 may be made through software updates while the UAV 100 is not operating or may be made dynamically and on the fly, for example, in response to detected conditions in the physical environment. For example, based on observed wind conditions, parameters associated with the rules 410 and/or machine learning models 412 may be adjusted automatically while the UAV 100 is in flight. Similarly, a user may provide an input (e.g., via mobile device 104) indicating a type of surface that the UAV will land on (e.g., flat surface vs. caught out of the air by hand). A parameter adjustment 414 based on the user's input may then be fed into the touchdown detector module 408 to adjust the touchdown detection process to suit the type of landing surface.

Further, in some embodiments, the dynamics model 404 of the UAV 100 may be adjusted based on various perception inputs. For example, a dynamics model 404 of the UAV 100 may be adjusted based on sensed weather conditions, control surface configurations, propulsion system output, etc.

Based on the processing of the force data from the external force estimator 406, the touchdown detector module 408 may generate outputs configured to maneuver the UAV 100 in some way. For example, in some embodiments, the touchdown detector module 408 may generate control commands or other signals that are output directly to a flight controller 160. Such control commands or signals may, for example, cause the flight controller 160 to increase or decrease thrust output by a propulsion system and/or adjust a configuration of a control surface. Alternatively, or in addition, the touchdown detector module 408 may generate a control command or signal that causes a behavioral objective generation process 416 to generate a behavioral objective that is then fed into the motion planner 130, for example, as described with respect to FIG. 3. In some embodiments, the touchdown detector module 408 may itself generate a behavioral objective.

The architecture flow diagram in FIG. 4 is an example provided for illustrative purposes and is not to be construed as limiting. Example system 400 may include more or fewer components and may arrange components differently than as shown. For example, the state observer 406, UAV dynamics model 404 and external force/torque estimator 402 may represent core underlying components of the navigation system 120 that are used by various subsystems such as the motion planner 130 and landing system 150 while the touchdown detector module 408 may be specific to a particular subsystem such as landing system 150.

Figure 5A:
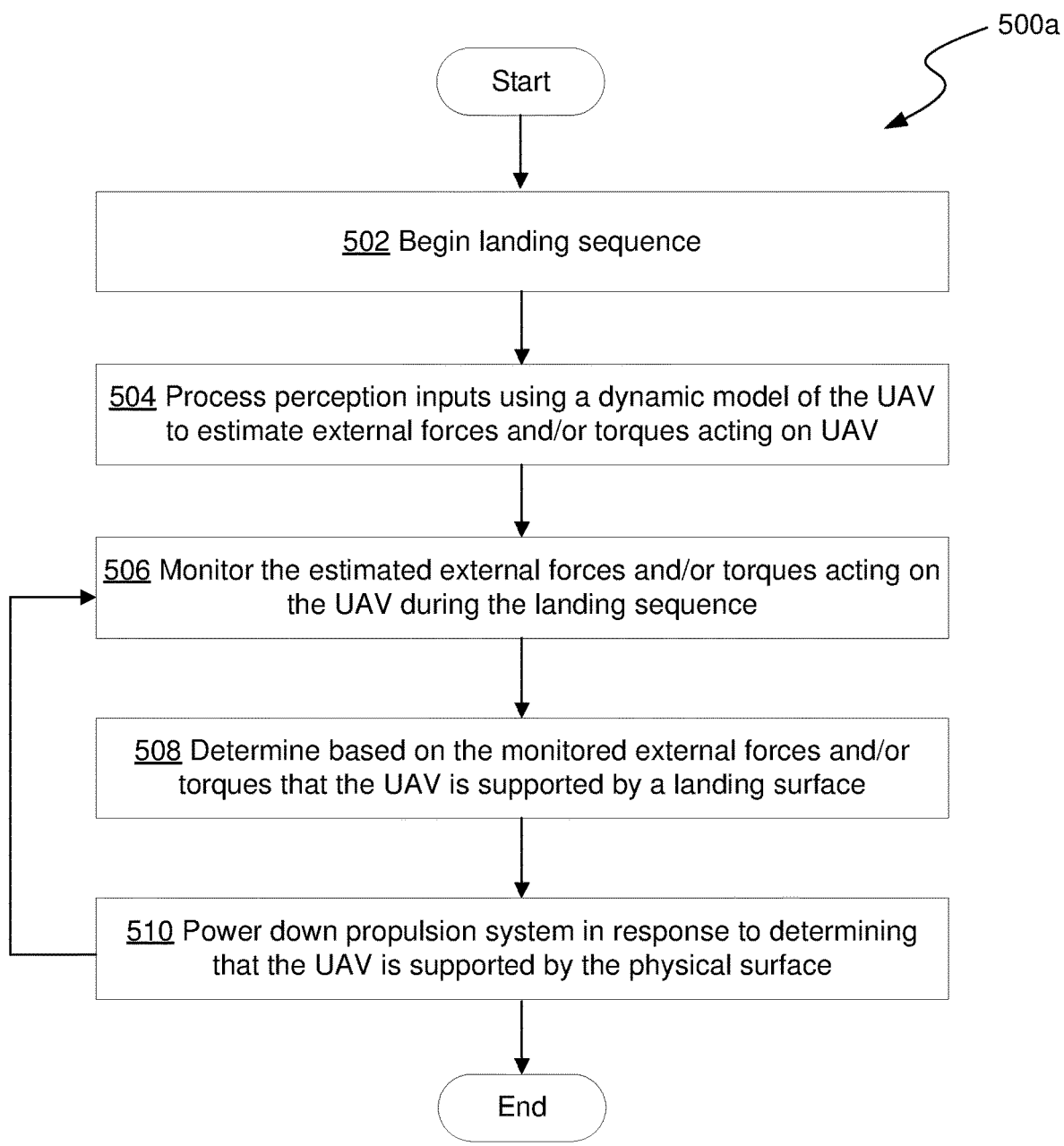
FIGS. 5A-5B are flow charts of example processes for touchdown detection, according to embodiments of the introduced technique.
Figure 5B:
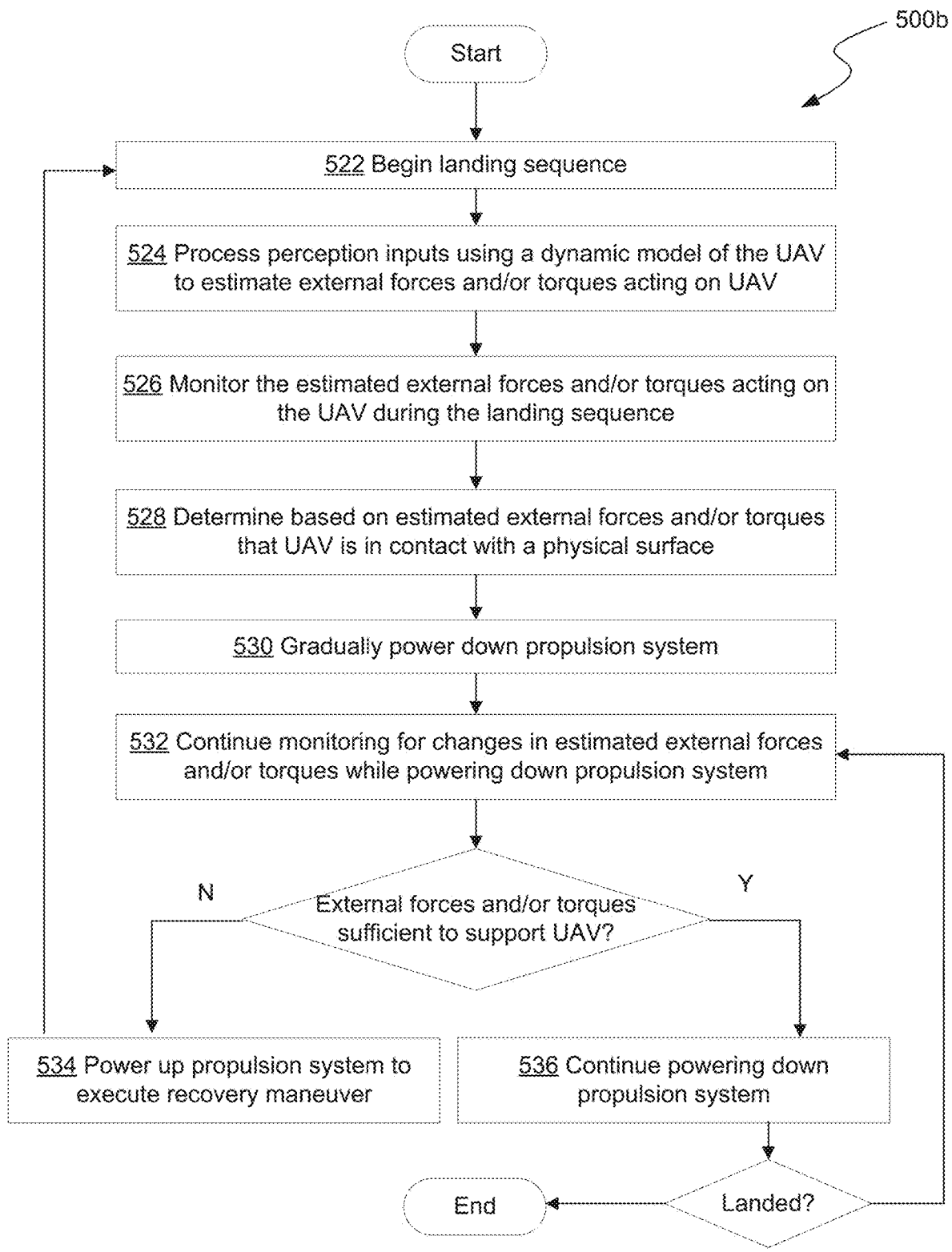

FIGS. 5A-5B show flow charts of example processes 500a-500b for touchdown detection according to the introduced technique. One or more steps of the example processes may be performed by any one or more of the components of the example navigation system 120 depicted in FIG. 2. For example, processes 500a-500b may be performed by a landing system 150 component of the navigation system 120. Further, performance of example processes 500a-550b may involve any of the computing components of the example computer systems of FIG. 21 or 22. For example, the example processes depicted in FIGS. 5A-5B may be represented in instructions stored in memory that are then executed by a processing unit. The processes 500a-500b described with respect to FIGS. 5A-5B are examples provided for illustrative purposes and are not to be construed as limiting. Other processes may include more or fewer steps than depicted while remaining within the scope of the present disclosure. Further, the steps depicted in example processes may be performed in a different order than is shown.

Example process 500a begins at step 502 with initiating a landing sequence. The landing sequence performed at step 502 may be controlled by a human (e.g., via remote control or onboard pilot control), partially autonomous, or fully autonomous. In some embodiments, step 502 may include a landing system 150 generating a landing objective that sets certain parameters (e.g., landing location, descent speed, etc.). Step 502 may further include the landing system 150 inputting, or otherwise communicating, the generated landing objective into a motion planner 130. Step 502 may further include the motion planner 130 processing the landing objective along with one or more other behavioral objectives to generate a planned trajectory. Step 502 may further include a flight controller 160 utilizing the planned trajectory to generate the control commands that cause the UAV 100 to follow the planned trajectory to land. The landing sequence may be initiated in response to a user input, for example, received via a mobile device 104 in wireless communication with the UAV 100. Alternatively, or in addition, the landing sequence may be initiated autonomously by the UAV 100, for example, based on the conditions in the surrounding physical environment, the operational state of the UAV 100, a state of tracking a subject, etc. As an illustrative example, the UAV 100 may initiate an autonomous landing sequence in response to detecting that battery power has fallen below a threshold level (e.g., 10% charge).

At step 504, perception inputs are processed using a dynamics model 404 of the UAV 100 to estimate external forces and/or external torques acting on the UAV 100 while the UAV 100 is in flight and descending to land on a physical surface in a physical environment. As previously discussed with respect to FIG. 4, processing perception inputs may include receiving sensor data from one or more sensors onboard or otherwise associated with the UAV 100 while the UAV 100 is in flight through a physical environment. Specifically, step 504 may include receiving sensor data during descent to land on a landing surface in the physical environment. Sensor data may include data (e.g., images) from visual sensors such as an image capture device 114 and/or 115, data from motion sensors such as an accelerometer, gyroscope, IMU, etc., as well as data from other types of sensors such as a current sensor associated with one or more electric motors in a propulsion system associated with the UAV 100. In some embodiments, the perception inputs may include the results of initial processing of the sensor data such as state estimates by a state observer 406, disparity images, semantic information, etc.

At step 506, the estimated external forces and/or external torques acting on the UAV 100 are monitored as the UAV 100 continues to descend towards a landing surface. In other words, step 504 may be performed and reperformed continually (e.g., every 1 millisecond) as new perception inputs are received for processing. The force data including the estimated external force and/or torque values may be continually updated based on this continual processing of newly received perception inputs.

At step 508, example process 500a continues with determining that the UAV 100 is supported by the landing surface based on the monitoring of the estimated external forces and/or external torques acting on the UAV 100. As previously discussed with respect to FIG. 4, step 508 may include processing force data indicative of the external forces and/or external torques acting on the UAV 100 using one or more rules 410 and/or one or more machine learning models 412. Step 508 may also include processing state information associated with the UAV 100 such as velocity, angular velocity, and orientation along with the force data to determine that the UAV 100 is supported by the landing surface.

In response to detecting that the UAV 100 is sufficiently supported by the landing surface, example process 500a concludes with causing a propulsion system of the UAV 100 to power down to complete the landing sequence. As previously discussed with respect to FIG. 4, step 510 may include transmitting a command or a signal directly to a flight controller 160 to cause the propulsion system to power down. Alternatively, or in addition, step 510 may include generating a behavioral objective and inputting the behavioral objective into the motion planner 130 to cause the propulsion system to power down.

The example process 500b depicted in FIG. 5B is similar to the example process 500a depicted in FIG. 5A, except that it includes additional steps to ensure the UAV 100 is actually landed before powering down completely as well as steps to execute a recovery maneuver, if needed.

Example process 500b begins at steps 522, 524, and 526 with beginning a landing sequence, processing perception inputs using a dynamics model 404 of the UAV 100 to estimate external forces and/or external torques acting on the UAV 100, and monitoring the estimates while the UAV 100 is in flight and descending to land, similar to steps 502, 504, and 506 (respectively) in example process 500a of FIG. 5A.

Example process 500b continues at step 528 with determining, based on the monitored changes in the external forces and/or torques that the UAV 100 is in contact with, a surface in the physical environment regardless of whether the UAV 100 is sufficiently supported by the surface. Step 528 may also include processing state information associated with the UAV 100 such as velocity, angular velocity, and orientation along force data indicative of the changes in external forces and/or torques to determine that the UAV 100 is in contact with the surface.

In response to detecting the contact, process 500b continues at step 530 with causing the propulsion system to gradually reduce power (i.e., reduce thrust) over some period of time while at step 532 continuing to monitor for changes in the estimated external forces and/or torques as the propulsion system gradually reduces power. For example, the touchdown detector module 408 may generate a first control command or signal that is sent to the flight controller 160 to cause the propulsion system to gradually power down. Alternatively, or in addition, the touchdown detector module 408 may generate a first behavioral objective that is sent to the motion planner to cause the propulsion system to gradually power down. In some embodiments, the power is gradually reduced over a period of time on the order of 1 second; however, this period of time may differ depending on the characteristics of the UAV 100, operational requirements of the UAV 100, conditions in the physical environment, or other factors.

Power output by the propulsion system is gradually reduced to enable the UAV 100 to recover in case conditions change. For example, if the UAV 100 contacts a sloped landing surface, the UAV 100 may begin to slide down the slope as power is gradually decreased meaning that the UAV 100 is not actually supported by the surface. Powering down gradually allows the propulsion system to at step 534 power up to a takeoff thrust level to execute a recovery maneuver before the UAV 100 crashes or is otherwise damaged.

If, however, the UAV 100 remains supported while the propulsion system powers down, the propulsion system may at step 536 continue powering down until completely powered off thereby completing the landing sequence. For example, the touchdown detector module 408 may generate a second control command or signal that is sent to the flight controller 160 to cause the propulsion system to power off completely (i.e., reduce thrust to zero). Alternatively, or in addition, the touchdown detector module 408 may generate a second behavioral objective that is sent to the motion planner to cause the propulsion system to power off completely.

In some embodiments, certain steps of example processes 500*a* and/or 500*b* may not be performed until the UAV 100 is within a threshold separation distance from a known surface in the physical environment such as the ground. For example, a touchdown detector module 408 may not begin processing force data from the external force estimator 406 until the UAV 100 is within a foot or so of the ground. Delaying the process of detecting contact with a surface and/or whether the UAV 100 is sufficiently supported may improve overall effectiveness in several respects. First, delaying this processing, which may be computationally intensive, until a last moment before touchdown will conserve computing resources as well as energy resources. This may be critical in certain situations, for example, where the UAV 100 is landing due to a low battery. Second, delaying this processing until the UAV 100 is in close proximity to known physical surfaces (e.g., the ground) may reduce false positive determinations, for example, caused by a sudden upward gust of wind. The separation distance to surfaces below the UAV 100 may be calculated in several different ways such as by using a range finding sensor (e.g., downward facing LIDAR) and/or a downward facing stereoscopic image capture device.

Figure 6:
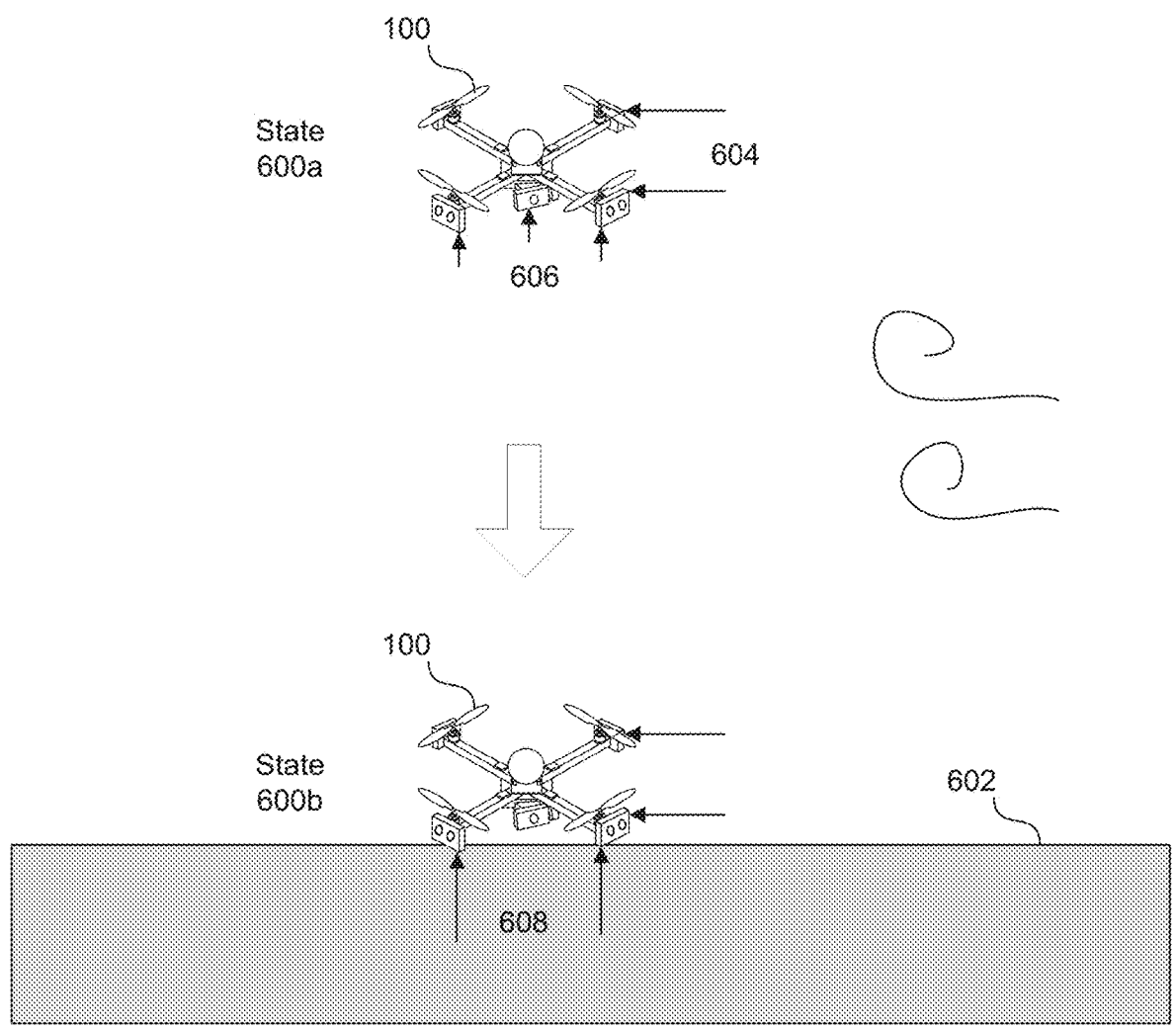
FIG. 6 is a diagram of a first example scenario involving a UAV during a landing sequence.

FIG. 6 shows a diagram of an example scenario involving a UAV 100 during a landing sequence. As shown in FIG. 6, at state 600*a*, the UAV 100 has begun descending towards the physical ground 602 to land. During the descent, a landing system 150 associated with the UAV 100 may continually or periodically process perception inputs based on sensor data from various onboard sensors using a dynamics model 404 for the UAV 100 in order to estimate the external forces and/or torques acting on the UAV 100 at any given moment. For example, by observing the motion response by the UAV 100 in view of motor control outputs by a propulsion system, the landing system 150 may estimate certain external lateral forces 604, for example, due to wind. Similarly, the landing system 150 may estimate certain vertical forces 606, for example, due to air resistance as the UAV 100 descends. For illustrative clarity, certain assumed forces, such as the downward force due to gravity, are omitted from the diagram of FIG. 6. Notably, external force estimations may rely on the observed motion response by the UAV 100 using the dynamics model and not on measurements from tactile force sensors, although such tactile sensors may be incorporated for additional accuracy in some embodiments.

As the UAV 100 descends towards the ground 602, the landing system 150 may cause the UAV 100 to slow the rate of the descent to execute a soft landing. For example, the landing system 150 may track the estimated height off the ground based on depth measurements from a downward facing stereoscopic camera 114 or other types of sensors.

Eventually, at some point during the descent, portions of the body of the UAV 100 come into contact with a physical surface. For example, state 600*b* shown in FIG. 6 has the UAV 100 in contact with a flat ground surface 602. In the example state 600*b* depicted in FIG. 6, the UAV 100 has its weight roughly evenly distributed on the ground surface 602. In other words, the ground surface 602 is exerting upward vertical force 608 (i.e., a normal force) on the portions of the body of the UAV 100 in contact. Again, by processing the motion response of the UAV based on certain perception inputs using a dynamics model 404 of the UAV 100, the landing system 150 can estimate these external supporting forces 608 (including magnitude, location, and direction). Assuming that the rate of descent has properly retarded before touchdown, the magnitude of the supporting force 608 introduced by the ground surface 602 should be relatively low at first contact since the propulsion system of the UAV 100 is still providing some of the upward force. Note, however that this may not always be the case as ground effect may manifest in an increased upward lift force. In some embodiments, the landing system 150 may be configured to distinguish between the increased lift force due to ground effect and an initial contact with the ground.

In response to detecting this initial contact, the landing system 150 of the UAV 100 may cause the propulsion system to gradually reduce upward thrust while continually gathering updated estimates of the external forces and/or torques (e.g., force 608) acting on the body of the UAV. As the upward thrust provided by the propulsion system is reduced, estimates of the supporting force 608 should increase as more of the weight of the UAV 100 is left to be supported by the surface 602. For example, the landing system 150 may observe that the UAV 100 is not changing position or orientation in response to the reduced thrust output by the propulsion systems. The landing system 150 can then infer that an external vertical force 608 is acting on the UAV 100 and estimate this force (magnitude, location, direction, etc.) using the dynamics model 404.

Eventually, the landing system 150 may determine, based on force data and/or other UAV state information, that the body of the UAV 100 is sufficiently supported by a landing surface (i.e., ground 602) and begin further powering down the propulsion systems. Note, that during this process of powering down the propulsion systems, the landing system 150 will continue to monitor perception inputs for motion response and thereby update external force and/or torque estimates. If anything changes, for example, due to a gust of wind or instability in the landing surface, and the landing system 150 determines, based on the external force estimates, that the UAV 100 is no longer sufficiently supported, the landing system 150 may cause the UAV 100 to power up the propulsion system (e.g., increase thrust to a takeoff level) to execute a recovery maneuver. For example, a recovery maneuver may involve increasing thrust to a predetermined takeoff level to ascend to a predetermined safe altitude before re-attempting a landing sequence.

Figure 7:
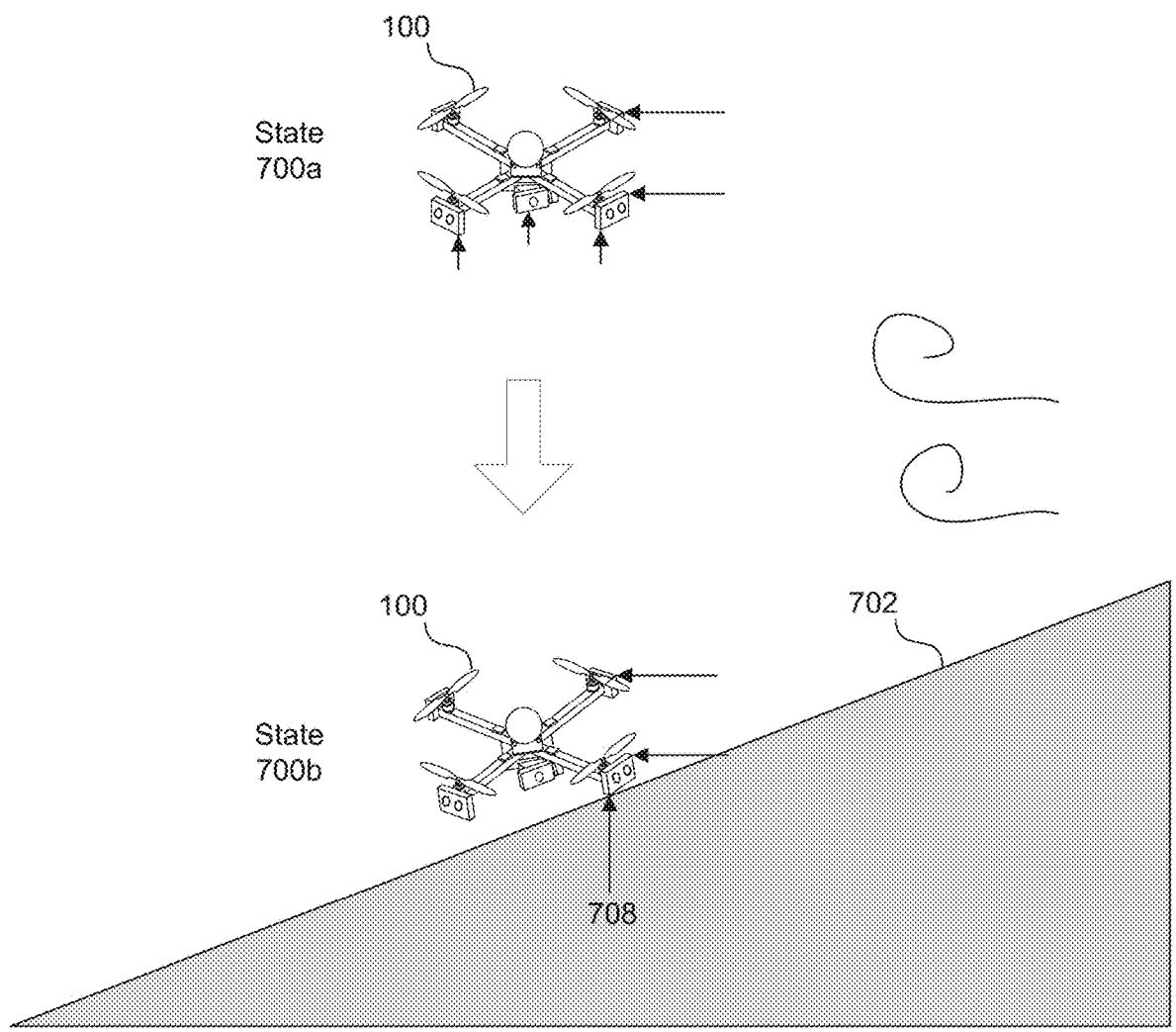
FIG. 7 is a diagram of a second example scenario involving a UAV during a landing sequence.
Figure 8:
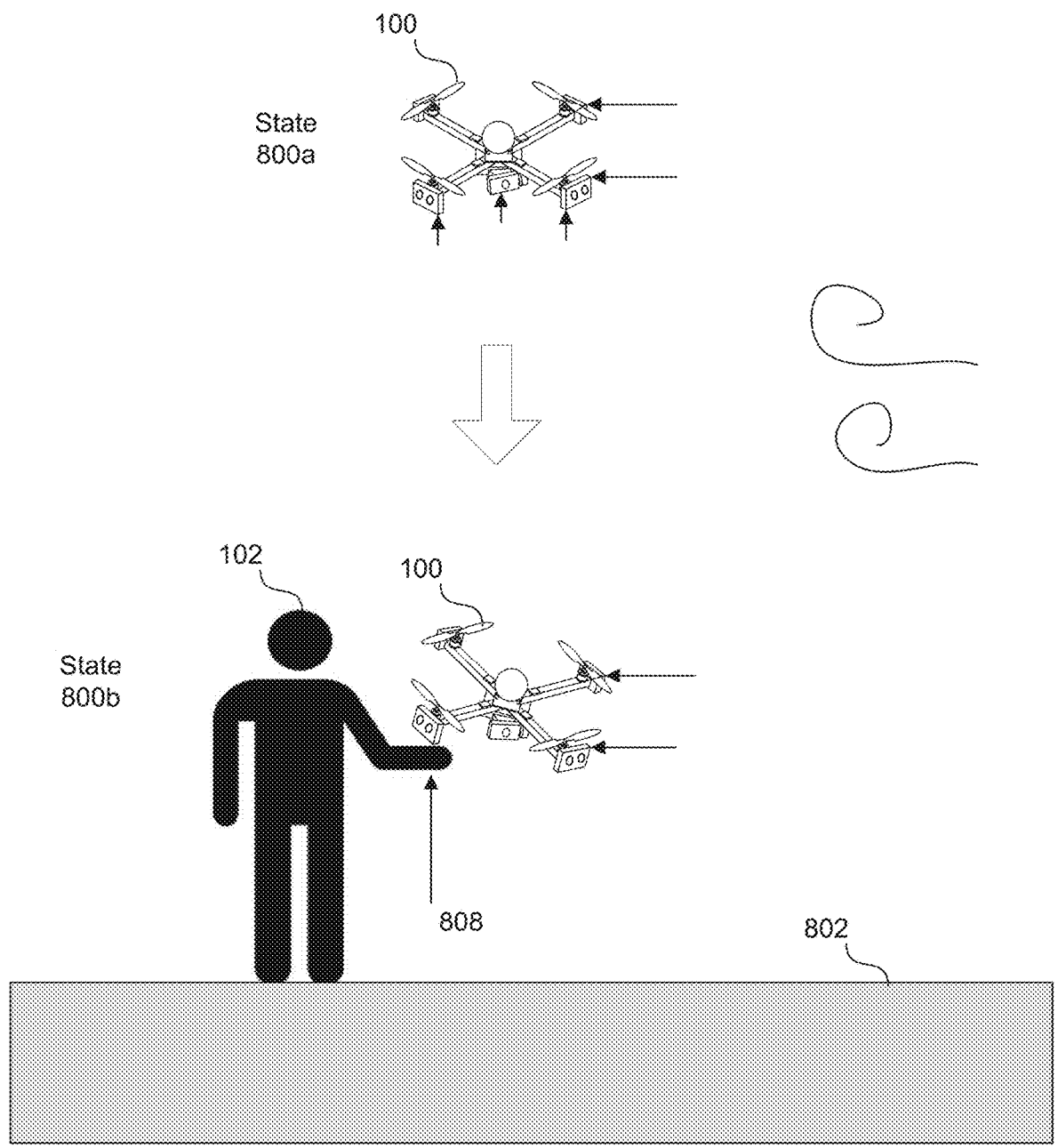
FIG. 8 is a diagram of a third example scenario involving a UAV during a landing sequence.
Figure 9:
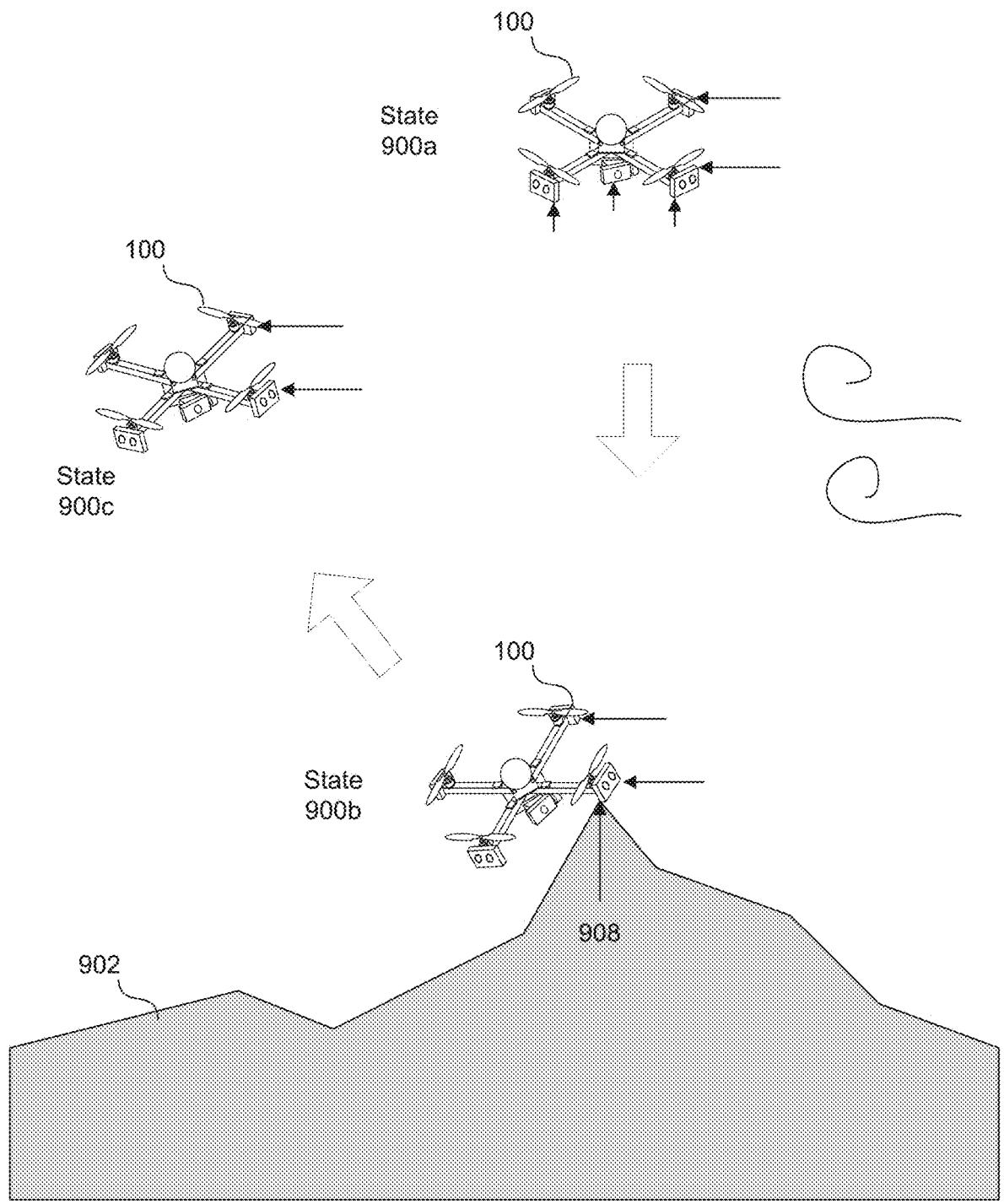
FIG. 9 is a diagram of a fourth example scenario involving a UAV during a landing sequence.

FIGS. 7-9 illustrate some other example use case scenarios that demonstrate the capabilities of the disclosed technique. Specifically, FIG. 7 depicts a scenario similar to that depicted in FIG. 6, except that the landing surface is a sloped ground surface 702. As shown in FIG. 7, at state 700*b*, a portion of the body of the UAV 100 is in contact with the sloped surface. Notably, based on the described technique, the landing system 150 may estimate the external force 708 exerted by the sloped surface and may recognize that the force is localized to a particular portion of the body of the UAV 100. Similar to the scenario depicted in FIG. 6, the landing system 150 may cause the propulsion system to gradually power down while continuing to monitor the estimated external forces. If the slope of the ground surface 702 is not too extreme, other portions of the UAV 100 will eventually contact the ground surface 702 as the thrust from the propulsion system reduces and the UAV 100 rotates to rest on the sloped surface 702. Once the landing system 150 determines, based on the estimated external forces, that the UAV 100 is sufficiently supported, the landing system 150 may completely power down the propulsion system.

FIG. 8 depicts a scenario involving normal landing into a user's 102 hand. In an example embodiment, the user 102 issues a command, for example, via mobile device 104, to land. In response, the landing system 150 causes the UAV 100 to begin a controlled vertical descent (see state 800a). At some point during the descent, the user 102 may grab the UAV 100 out of the air. Using the previously described technique, the landing system 150 may estimate the external forces acting on the UAV 100 which may include forces 808 exerted by the hand of the user 102 grabbing the UAV 100 (see state 800b). In response, the landing system 150 may cause the propulsion system to gradually power down, thereby enabling the user 102 to directly manipulate the position/orientation of the UAV 100. In doing so, the user 102 can move and rotate (to some limit) the UAV 100 when grabbed without the UAV 100 having an adverse reaction. For example, in response to detecting the contact, the landing system 150 may cause the propulsion system to begin to power down, but will not attempt corrective measures in response to the user's manipulations unless the landing system 150 determines, based on updated estimates of external forces, that the user 102 has let go of the UAV 100. The landing system 150 may cause the propulsion system to maintain some level of thrust for a certain period of time (e.g., 1-2 seconds) before confirming, based on force data and/or other UAV state information, that the user 102 is still holding the UAV 100, and completely powering down the propulsion system. If, during this period of time, the landing system 150 determines, based on external forces, that the UAV 100 is not sufficiently supported (e.g., because the user 102 let go), the landing system 150 may power up the propulsion system to execute a recovery maneuver.

FIG. 9 depicts a scenario involving a UAV 100 encountering a surface that is not suitable for landing. For example, the surface depicted in FIG. 9 is a ground surface 902 that is extremely uneven (e.g., due to jagged rocks). Similarly, unsuitable surfaces may include an edge of a table, a horizontal pole, tree branches, an extremely steep slope, a body of water, etc. At some point during the descent (see state 900a), the UAV 100 comes into contact with the surface 902 (see state 900b). As previously described, the landing system 150 starts to power down the propulsion system; however, in response to detecting that the surface 902 is not applying sufficient external forces 908 or that the UAV 100 is moving unexpectedly, the landing system 150 may then power up the propulsion system to execute a recovery maneuver (see state 900c).

Figure 10:
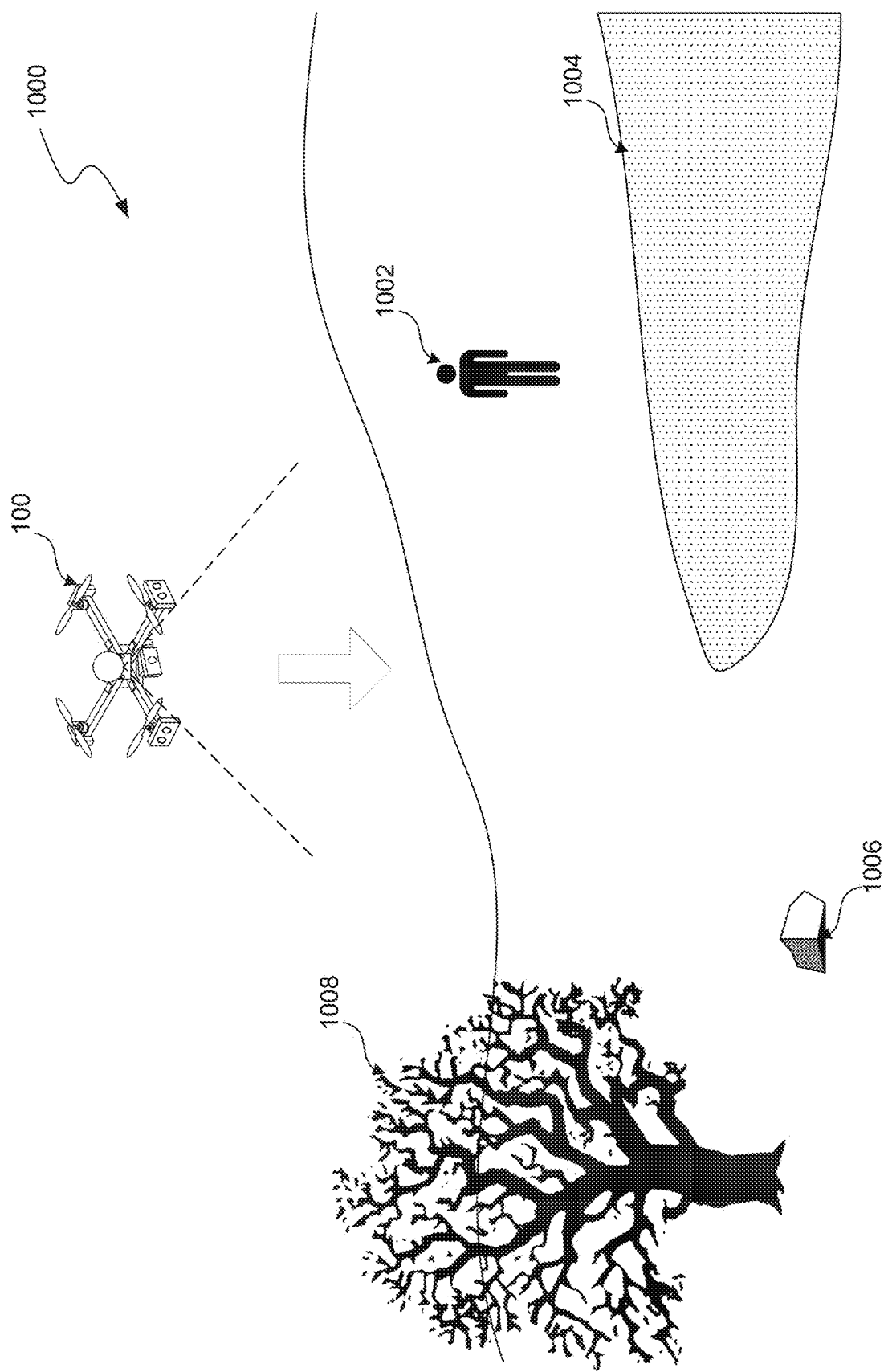
FIG. 10 shows a UAV in flight over a physical environment populated with various objects.

In some embodiments, the landing system 150 may be configured to utilize semantic information regarding the surrounding physical environment when implementing the introduced technique for touchdown detection. Specifically, the landing system 150 may configure certain parameters associated with a touchdown detection process depending on semantic information such as the presence of hazardous objects (e.g., people, trees, bodies of water), a type of landing surface (e.g., level, uneven, sloped, moving, etc.). For example, as discussed with respect to FIG. 4, inputs in the form of parameter adjustments 414 may change one or more parameters associated with rules 410 and/or machine learning models that are applied to detect when the UAV 100 is in contact with a surface or sufficiently supported by the surface. FIG. 10 depicts a UAV 100 in flight over a physical environment similar to that depicted in FIGS. 5-8. In FIG. 10, the physical environment 1000 is populated with various objects such as a person 1002, a lake 1004, a rock 1006, and a tree 1008.

Figure 11:
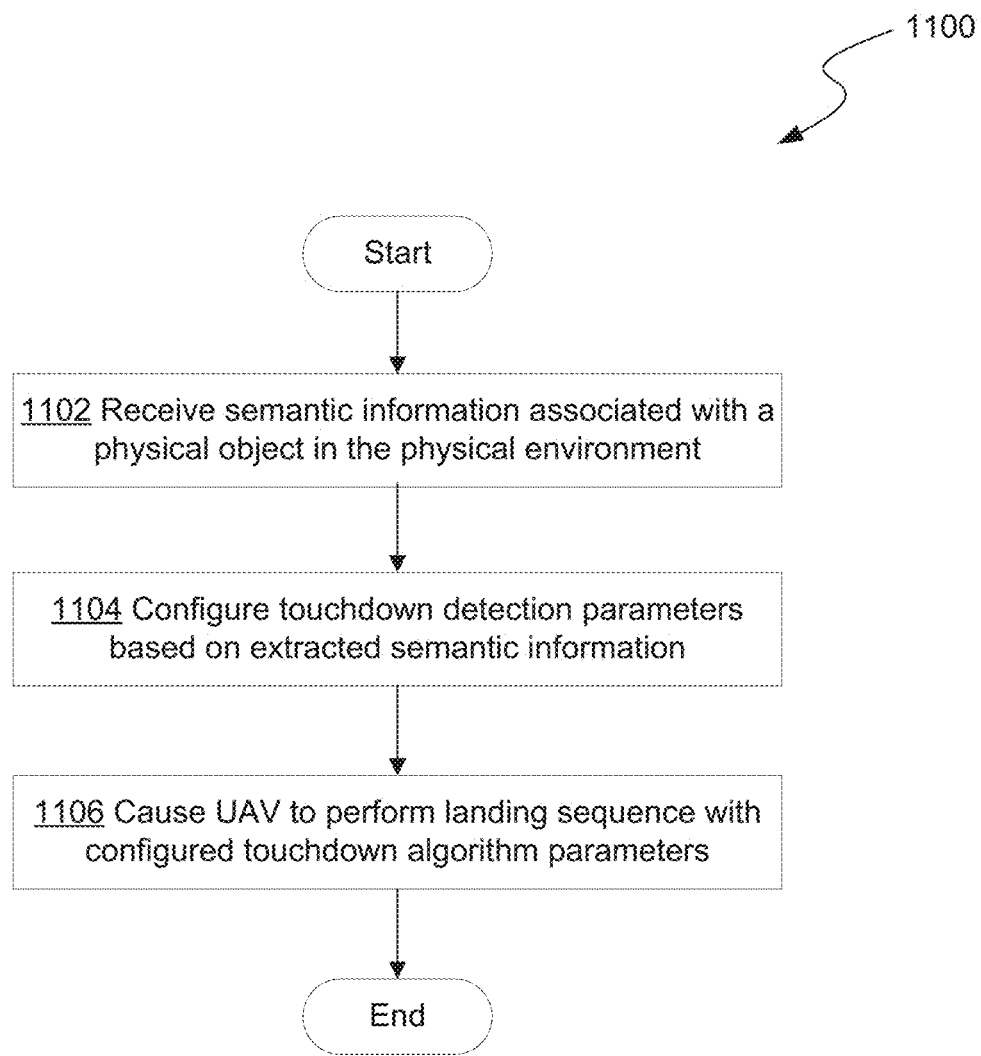
FIG. 11 is a flow chart of an example process for using semantic information to configure certain parameters of a touchdown detection process, according to embodiments of the introduced technique.

FIG. 11 shows a flow chart of an example process 1100 utilizing semantic information to configure certain touchdown detection parameters. One or more steps of the example process 1100 may be performed by any one or more of the components of the example navigation system 120 depicted in FIG. 2. For example, process 1100 may be performed by a landing system 150 component of the navigation system 120. Further, performance of example process 1100 may involve any of the computing components of the example computer systems of FIG. 21 or 22. For example, the example process 1100 may be represented in instructions stored in memory that are then executed by a processing unit. The process 1100 described with respect to FIG. 11 is an example provided for illustrative purposes and is not to be construed as limiting. Other processes may include more or fewer steps than depicted while remaining within the scope of the present disclosure. Further, the steps depicted in example process may be performed in a different order than is shown.

Example process 1100 begins at step 1102 with receiving semantic information associated with one or more physical objects in the physical environment. Semantic information regarding a captured object can include information such as an object's category (i.e., class), location, shape, size, scale, pixel segmentation, orientation, inter-class appearance, activity, and pose. Such semantic information can be received in a number of different ways.

In some embodiments, semantic information associated with these objects can be extracted by processing sensor data such as images captured by image capture devices 114/115. Techniques for detecting objects and extracting semantic information associated with the detected objects are described in more detail later under the section titled "Object Detection" and with reference to FIGS. 15-20, but may include for example, processing images to detect an object and then assigning some semantic label to the detected object, for example, by classifying the detected object using a machine learning appearance model. The processes for detecting objects in the physical environment are described in later sections as being performed by a separate tracking system 140 to facilitate subject tracking; however, such processes may similarly be performed by a landing system 150 as part of a smart landing process. In some embodiments, the landing system 150 may communicate with the tracking system 140 to receive semantic information regarding objects detected by the tracking system 140. Alternatively, or in addition, the landing system 150 may perform certain processes independent of, and in parallel with, the tracking system 140.

In other embodiments, semantic information may be gathered from other sources such as inputs by a user via a mobile device 104 or from a database of information on known object locations. For example, before the UAV 100 lands, the landing system 150 may receive an input indicative of a user selection of a type of physical surface (e.g., a substantially level surface, a sloped surface, or a moving surface) that the UAV will land on (i.e., semantic information) and adjust certain parameters for touchdown detection accordingly.

In any case, the semantic information can be utilized at step 1104 to configure certain parameters of a landing and/or touchdown algorithm for implementing the disclosed technique for touchdown detection. For example, the landing system 150 may classify a landing area as hazardous based on extracted semantic information due, for example, to the presence of a large number of people 1002. In response, the landing system 150 may adjust a descend rate parameter to slow the descent of the UAV 100 when executing the landing sequence. Alternatively, or in addition, the landing system 150 may adjust a touchdown detection parameter (e.g., a sensitivity criterion) to be better prepared to recover if an encountered surface is not suitable for landing. For example, an adjusted parameter may control a period of time during which the propulsion system gradually powers down in response to detecting contact and/or may adjust certain criteria associated with determining whether estimated external forces are sufficiently supporting the UAV 100.

The UAV 100 may then proceed at step 1106 to complete the autonomous landing process using the touchdown detection parameters configured at step 1104.

Localization

Figure 12:
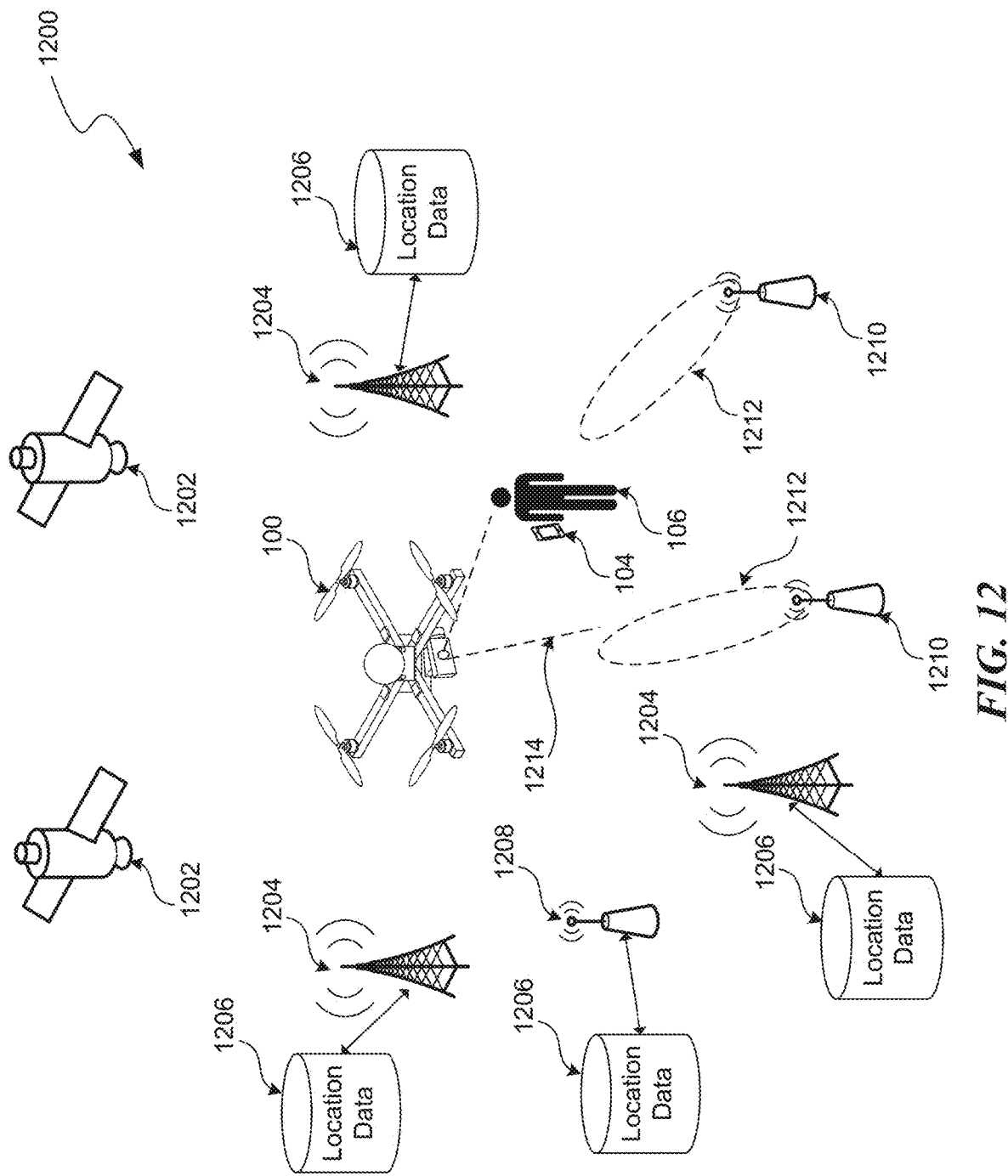
FIG. 12 is a diagram of an example localization system with which at least some operations described in this disclosure can be implemented.

A navigation system 120 of a UAV 100 may employ any number of systems and techniques for localization. FIG. 12 shows an illustration of an example localization system 1200 that may be utilized to guide autonomous navigation of a vehicle such as a UAV 100. In some embodiments, the positions and/or orientations of the UAV 100 and various other physical objects in the physical environment can be estimated using any one or more of the subsystems illustrated in FIG. 12. By tracking changes in the positions and/or orientations over time (continuously or at regular or irregular time intervals (i.e., continually)), the motions (e.g., velocity, acceleration, etc.) of UAV 100 and other objects may also be estimated. Accordingly, any systems described herein for determining position and/or orientation may similarly be employed for estimating motion.

As shown in FIG. 12, the example localization system 1200 may include the UAV 100, a global positioning system (GPS) comprising multiple GPS satellites 1202, a cellular system comprising multiple cellular antennae 1204 (with access to sources of localization data 1206), a Wi-Fi system comprising multiple Wi-Fi access points 1208 (with access to sources of localization data 1206), and/or a mobile device 104 operated by a user 106.

Satellite-based positioning systems such as GPS can provide effective global position estimates (within a few meters) of any device equipped with a receiver. For example, as shown in FIG. 12, signals received at a UAV 100 from satellites of a GPS system 1202 can be utilized to estimate a global position of the UAV 100. Similarly, positions relative to other devices (e.g., a mobile device 104) can be determined by communicating (e.g., over a wireless communication link 116) and comparing the global positions of the other devices.

Localization techniques can also be applied in the context of various communications systems that are configured to transmit communication signals wirelessly. For example, various localization techniques can be applied to estimate a position of UAV 100 based on signals transmitted between the UAV 100 and any of cellular antennae 1204 of a cellular system or Wi-Fi access points 1208, 1210 of a Wi-Fi system. Known positioning techniques that can be implemented include, for example, time of arrival (ToA), time difference of arrival (TDoA), round trip time (RTT), angle of Arrival (AoA), and received signal strength (RSS). Moreover, hybrid positioning systems implementing multiple techniques such as TDoA and AoA, ToA and RSS, or TDoA and RSS can be used to improve the accuracy.

Some Wi-Fi standards, such as 802.11ac, allow for RF signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 12 by dotted lines 1212 emanating from Wi-Fi routers 1210.

An inertial measurement unit (IMU) may be used to estimate position and/or orientation of a device. An IMU is a device that measures a vehicle's angular velocity and linear acceleration. These measurements can be fused with other sources of information (e.g., those discussed above) to accurately infer velocity, orientation, and sensor calibrations. As described herein, a UAV 100 may include one or more IMUs. Using a method commonly referred to as "dead reckoning," an IMU (or associated systems) may estimate a current position based on previously measured positions using measured accelerations and the time elapsed from the previously measured positions. While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include localization data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

Computer vision may be used to estimate the position and/or orientation of a capturing camera (and by extension a device to which the camera is coupled), as well as other objects in the physical environment. The term, "computer vision" in this context may generally refer to any method of acquiring, processing, analyzing and "understanding" captured images. Computer vision may be used to estimate position and/or orientation using a number of different methods. For example, in some embodiments, raw image data received from one or more image capture devices (onboard or remote from the UAV 100) may be received and processed to correct for certain variables (e.g., differences in camera orientation and/or intrinsic parameters (e.g., lens variations)). As previously discussed with respect to FIG. 1, the UAV 100 may include two or more image capture devices 114/115. By comparing the captured image from two or more vantage points (e.g., at different time steps from an image capture device in motion), a system employing computer vision may calculate estimates for the position and/or orientation of a vehicle on which the image capture device is mounted (e.g., UAV 100) and/or of captured objects in the physical environment (e.g., a tree, building, etc.).

Figure 13:
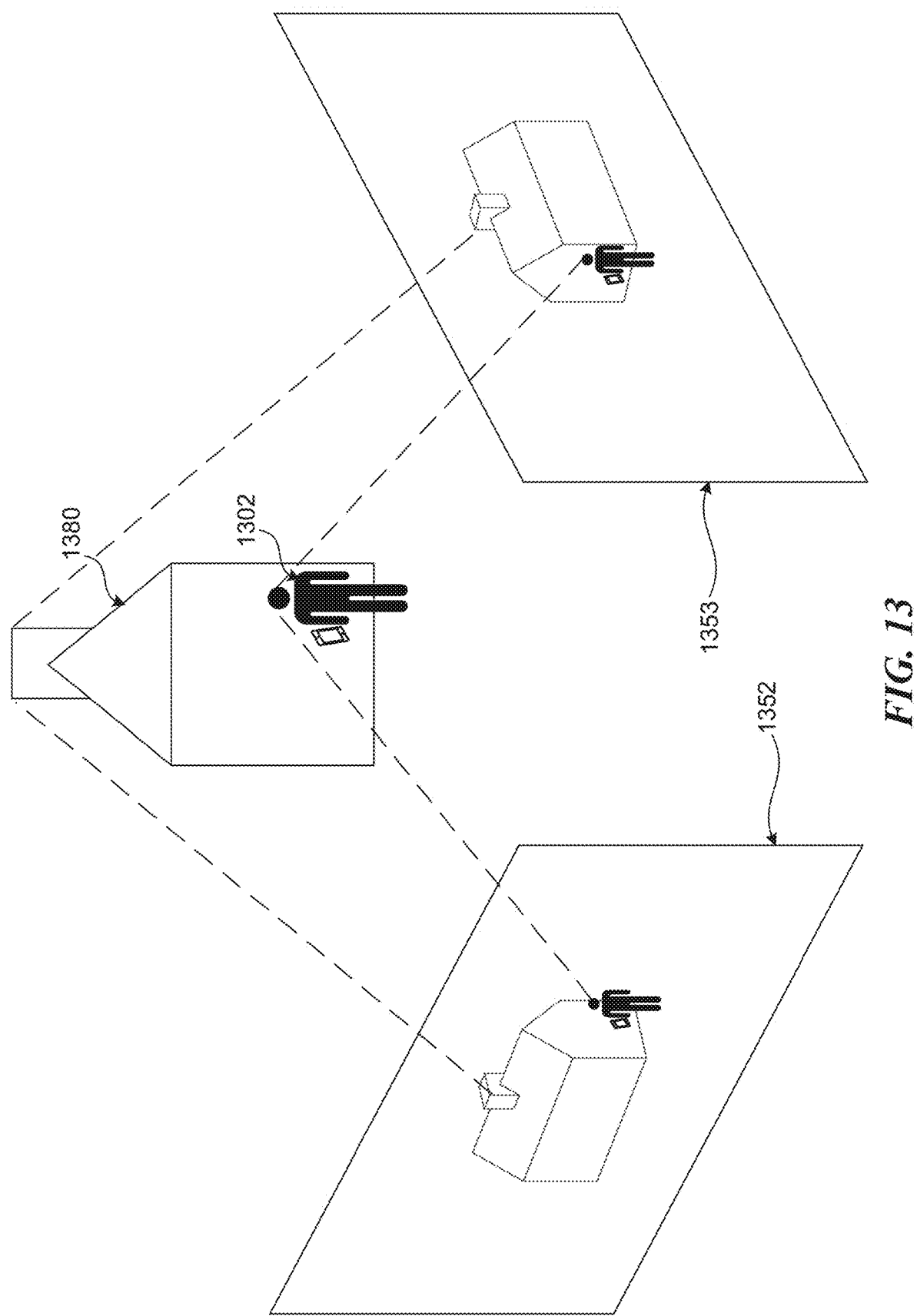
FIG. 13 is a diagram illustrating the concept of visual odometry based on captured images.

Computer vision can be applied to estimate position and/or orientation using a process referred to as "visual odometry." FIG. 13 illustrates the working concept behind visual odometry at a high level. A plurality of images are captured in sequence as an image capture device moves through space. Due to the movement of the image capture device, the images captured of the surrounding physical environment change from frame to frame. In FIG. 13, this is illustrated by initial image capture FOV 1352 and a subsequent image capture FOV 1354 captured as the image capture device has moved from a first position to a second position over a period of time. In both images, the image capture device may capture real world physical objects, for example, the house 1380 and/or the person 1302. Computer vision techniques are applied to the sequence of images to detect and match features of physical objects captured in the FOV of the image capture device. For example, a system employing computer vision may search for correspondences in the pixels of digital images that have overlapping FOV. The correspondences may be identified using a number of different methods such as correlation-based and feature-based methods. As shown in FIG. 13, features such as the head of a human subject 1302 or the corner of the chimney on the house 1380 can be identified, matched, and thereby tracked. By incorporating sensor data from an IMU (or accelerometer(s) or gyroscope(s)) associated with the image capture device to the tracked features of the image capture, estimations may be made for the position and/or orientation of the image capture relative to the objects 1380, 1302 captured in the images. Further, these estimates can be used to calibrate various other systems, for example, through estimating differences in camera orientation and/or intrinsic parameters (e.g., lens variations) or IMU biases and/or orientation. Visual odometry may be applied at both the UAV 100 and any other computing device, such as a mobile device 104, to estimate the position and/or orientation of the UAV 100 and/or other objects. Further, by communicating the estimates between the systems (e.g., via a wireless communication link 116) estimates may be calculated for the respective positions and/or orientations relative to each other. Position and/or orientation estimates based in part on sensor data from an onboard IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, data received from sensors onboard the UAV 100 can be processed to generate a 3D map of the surrounding physical environment while estimating the relative positions and/or orientations of the UAV 100 and/or other objects within the physical environment. This process is sometimes referred to as simultaneous localization and mapping (SLAM). In such embodiments, using computer vision processing, a system in accordance with the present teaching, can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

Figure 14:
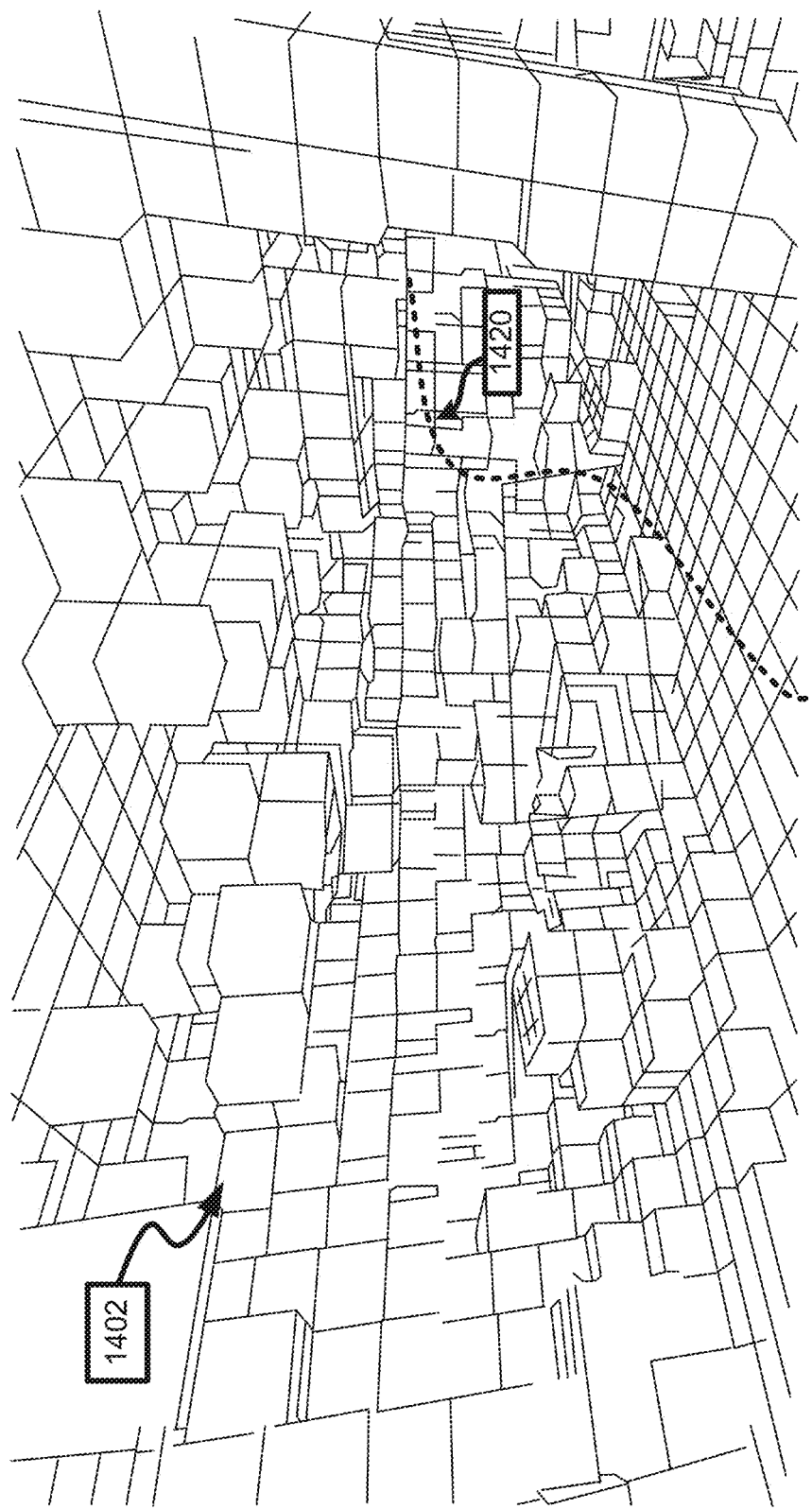
FIG. 14 is an example view of a three-dimensional (3D) occupancy map of a physical environment.

In some embodiments, a 3D model of the surrounding physical environment may be generated as a 3D occupancy map that includes multiple voxels with each voxel corresponding to a 3D volume of space in the physical environment that is at least partially occupied by a physical object. For example, FIG. 14 shows an example view of a 3D occupancy map 1402 of a physical environment including multiple cubical voxels. Each of the voxels in the 3D occupancy map 1402 corresponds to a space in the physical environment that is at least partially occupied by a physical object. A navigation system 120 of a UAV 100 can be configured to navigate the physical environment by planning a 3D trajectory 1420 through the 3D occupancy map 1402 that avoids the voxels. In some embodiments, this 3D trajectory 1420 plan using the 3D occupancy map 1402 can be optimized by applying an image space motion planning process. In such an embodiment, the planned 3D trajectory 1420 of the UAV 100 is projected into an image space of captured images for analysis relative to certain identified high cost regions (e.g., regions having invalid depth estimates).

Computer vision may also be applied using sensing technologies other than cameras, such as light detection and ranging (LIDAR) technology. For example, a UAV 100 equipped with LIDAR may emit one or more laser beams in a scan up to 360 degrees around the UAV 100. Light received by the UAV 100 as the laser beams reflect off physical objects in the surrounding physical world may be analyzed to construct a real time 3D computer model of the surrounding physical world. Depth sensing through the use of LIDAR may in some embodiments augment depth sensing through pixel correspondence as described earlier. Further, images captured by cameras (e.g., as described earlier) may be combined with the laser constructed 3D models to form textured 3D models that may be further analyzed in real time or near real time for physical object recognition (e.g., by using computer vision algorithms).

The computer vision-aided localization techniques described above may calculate the position and/or orientation of objects in the physical world in addition to the position and/or orientation of the UAV 100. The estimated positions and/or orientations of these objects may then be fed into a motion planner 130 of the navigation system 120 to plan paths that avoid obstacles while satisfying certain objectives (e.g., as previously described). In addition, in some embodiments, a navigation system 120 may incorporate data from proximity sensors (e.g., electromagnetic, acoustic, and/or optics-based) to estimate obstacle positions with more accuracy. Further refinement may be possible with the use of stereoscopic computer vision with multiple cameras, as described earlier.

The localization system 1200 of FIG. 12 (including all of the associated subsystems as previously described) is only one example of a system configured to estimate positions and/or orientations of a UAV 100 and other objects in the physical environment. A localization system 1200 may include more or fewer components than shown, may combine two or more components, or may have a different configuration or arrangement of the components. Some of the various components shown in FIG. 12 may be implemented in hardware, software or a combination of both hardware and software, including one or more signal processing and/or application specific integrated circuits.

Object Tracking

A UAV 100 can be configured to track one or more objects, for example, to enable intelligent autonomous flight. The term "objects" in this context can include any type of physical object occurring in the physical world. Objects can include dynamic objects such as people, animals, and other vehicles. Objects can also include static objects such as landscape features, buildings, and furniture. Further, certain descriptions herein may refer to a "subject" (e.g., human subject 102). The terms "subject" as used in this disclosure may simply refer to an object being tracked using any of the disclosed techniques. The terms "object" and "subject" may, therefore, be used interchangeably.

With reference to FIG. 2, a tracking system 140 associated with a UAV 100 can be configured to track one or more physical objects based on images of the objects captured by image capture devices (e.g., image capture devices 114 and/or 115) onboard the UAV 100. While a tracking system 140 can be configured to operate based only on input from image capture devices, the tracking system 140 can also be configured to incorporate other types of information to aid in the tracking. For example, various other techniques for measuring, estimating, and/or predicting the relative positions and/or orientations of the UAV 100 and/or other objects are described with respect to FIGS. 12-20.

Figure 15:
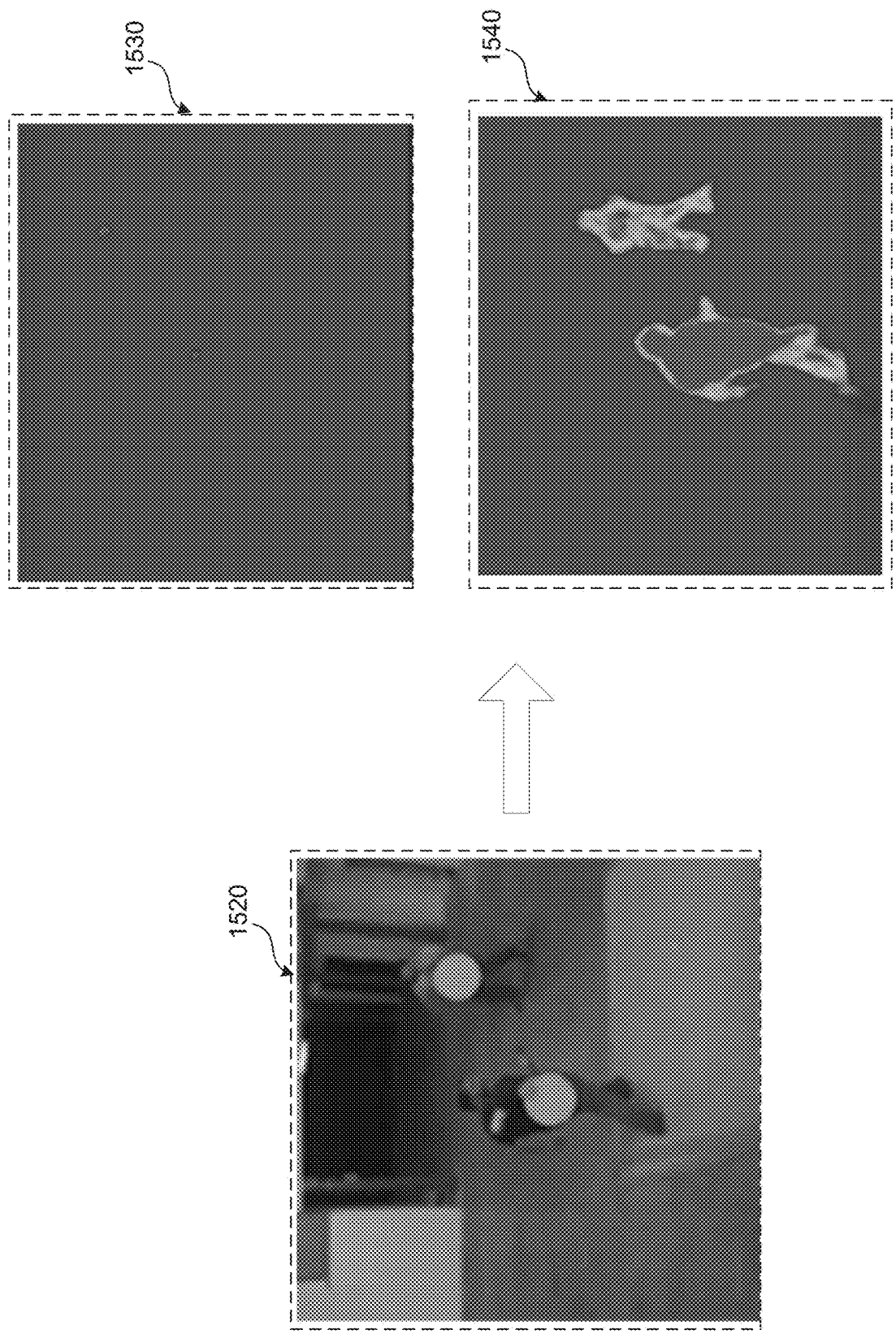
FIG. 15 is an example image captured by a UAV in flight through a physical environment with associated visualizations of data regarding tracked objects based on processing of the captured image.

In some embodiments, a tracking system 140 can be configured to fuse information pertaining to two primary categories: semantics and 3D geometry. As images are received, the tracking system 140 may extract semantic information regarding certain objects captured in the images based on an analysis of the pixels in the images. Semantic information regarding a captured object can include information such as an object's category (i.e., class), location, shape, size, scale, pixel segmentation, orientation, inter-class appearance, activity, and pose. In an example embodiment, the tracking system 140 may identify general locations and categories of objects based on captured images and then determine or infer additional detailed information about individual instances of objects based on further processing. Such a process may be performed as a sequence of discrete operations, a series of parallel operations, or as a single operation. For example, FIG. 15 shows an example image 1520 captured by a UAV in flight through a physical environment. As shown in FIG. 15, the example image 1520 includes captures of two physical objects, specifically, two people present in the physical environment. The example image 1520 may represent a single frame in a series of frames of video captured by the UAV. A tracking system 140 may first identify general locations of the captured objects in the image 1520. For example, pixel map 1530 shows two dots corresponding to the general locations of the captured objects in the image. These general locations may be represented as image coordinates. The tracking system 140 may further process the captured image 1520 to determine information about the individual instances of the captured objects. For example, pixel map 1540 shows a result of additional processing of image 1520 identifying pixels corresponding to the individual object instances (i.e., people in this case). Semantic cues can be used to locate and identify objects in captured images as well as associate identified objects occurring in multiple images. For example, as previously mentioned, the captured image 1520 depicted in FIG. 15 may represent a single frame in a sequence of frames of a captured video. Using semantic cues, a tracking system 140 may associate regions of pixels captured in multiple images as corresponding to the same physical object occurring in the physical environment.

In some embodiments, a tracking system 140 can be configured to utilize 3D geometry of identified objects to associate semantic information regarding the objects based on images captured from multiple views in the physical environment. Images captured from multiple views may include images captured by multiple image capture devices having different positions and/or orientations at a single time instant. For example, each of the image capture devices 114 shown mounted to a UAV 100 in FIG. 1 may include cameras at slightly offset positions (to achieve stereoscopic capture). Further, even if not individually configured for stereoscopic image capture, the multiple image capture devices 114 may be arranged at different positions relative to the UAV 100, for example, as shown in FIG. 1. Images captured from multiple views may also include images captured by an image capture device at multiple time instants as the image capture device moves through the physical environment. For example, any of the image capture devices 114 and/or 115 mounted to UAV 100 will individually capture images from multiple views as the UAV 100 moves through the physical environment.

Figure 16:
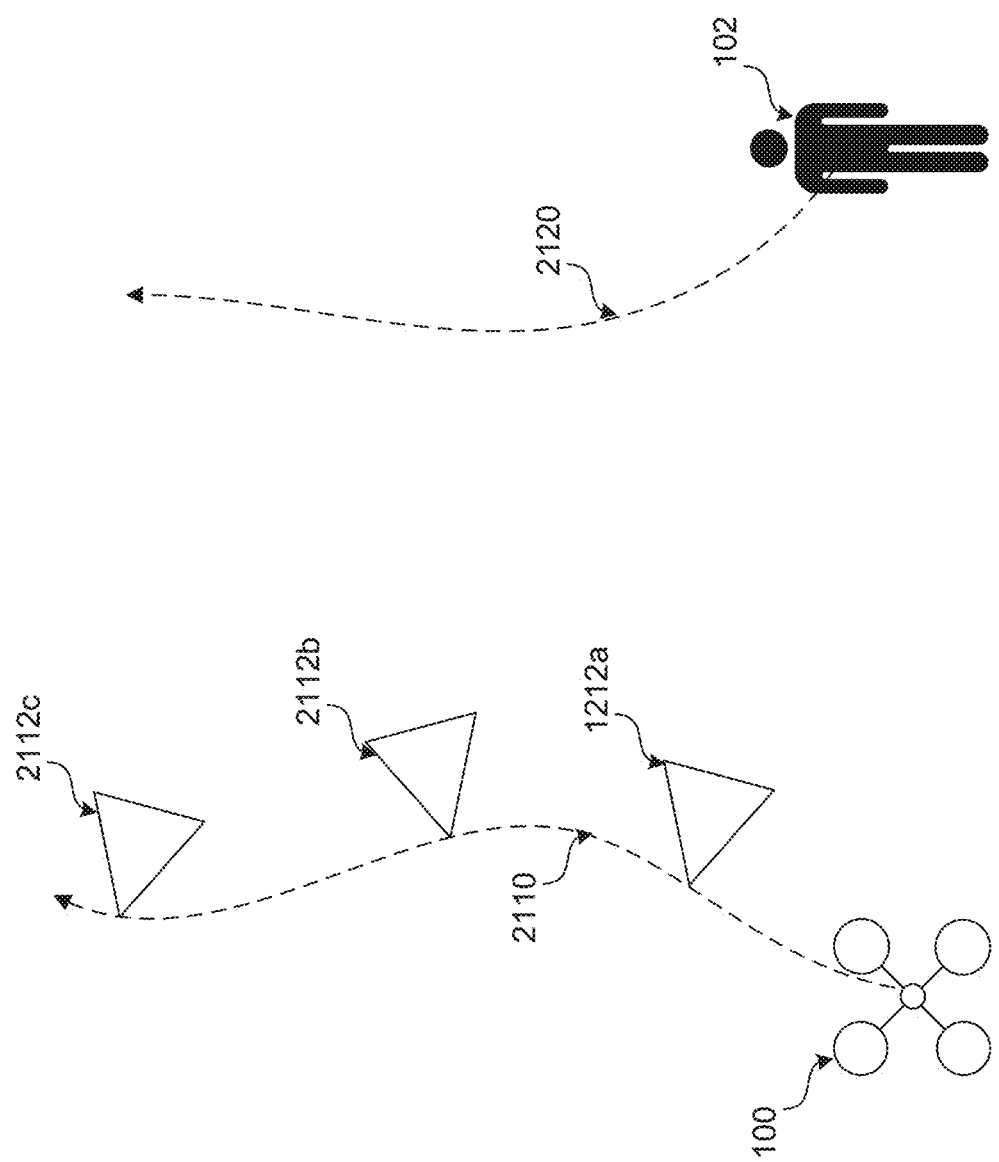
FIG. 16 is a diagram illustrating an example process for estimating a trajectory of an object based on multiple images captured by a UAV.

Using an online visual-inertial state estimation system, a tracking system 140 can determine or estimate a trajectory of the UAV 100 as it moves through the physical environment. Thus, the tracking system 140 can associate semantic information in captured images, such as locations of detected objects, with information about the 3D trajectory of the objects, using the known or estimated 3D trajectory of the UAV 100. For example, FIG. 16 shows a trajectory 1610 of a UAV 100 moving through a physical environment. As the UAV 100 moves along trajectory 1610, the one or more image capture devices (e.g., devices 114 and/or 115) capture images of the physical environment at multiple views 1612a-c. Included in the images at multiple views 1612a-c are captures of an object such as a human subject 102. By processing the captured images at multiple views 1612a-c, a trajectory 1620 of the object can also be resolved.

Object detections in captured images create rays from a center position of a capturing camera to the object along which the object lies, with some uncertainty. The tracking system 140 can compute depth measurements for these detections, creating a plane parallel to a focal plane of a camera along which the object lies, with some uncertainty. These depth measurements can be computed by a stereo vision algorithm operating on pixels corresponding with the object between two or more camera images at different views. The depth computation can look specifically at pixels that are labeled to be part of an object of interest (e.g., a subject 102). The combination of these rays and planes over time can be fused into an accurate prediction of the 3D position and velocity trajectory of the object over time.

While a tracking system 140 can be configured to rely exclusively on visual data from image capture devices onboard a UAV 100, data from other sensors (e.g., sensors on the object, on the UAV 100, or in the environment) can be incorporated into this framework when available. Additional sensors may include GPS, IMU, barometer, magnetometer, and cameras or other devices such as a mobile device 104. For example, a GPS signal from a mobile device 104 held by a person can provide rough position measurements of the person that are fused with the visual information from image capture devices onboard the UAV 100. An IMU sensor at the UAV 100 and/or a mobile device 104 can provide acceleration and angular velocity information, a barometer can provide relative altitude, and a magnetometer can provide heading information. Images captured by cameras on a mobile device 104 held by a person can be fused with images from cameras onboard the UAV 100 to estimate relative pose between the UAV 100 and the person by identifying common features captured in the images. Various other techniques for measuring, estimating, and/or predicting the relative positions and/or orientations of the UAV 100 and/or other objects are described with respect to FIGS. 12-20.

Figure 17:
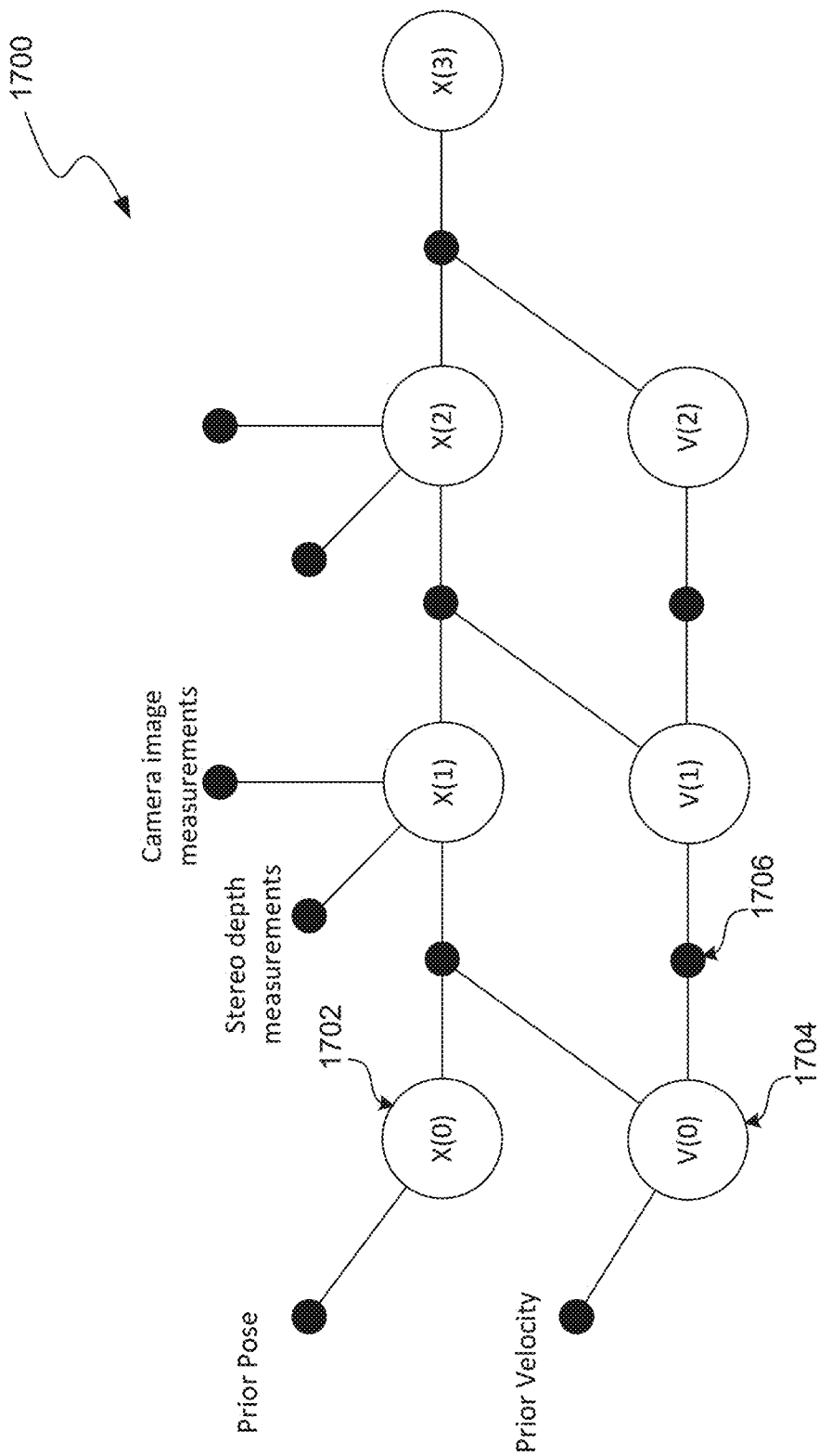
FIG. 17 is a diagrammatic representation of an example spatiotemporal factor graph.

In some embodiments, data from various sensors are input into a spatiotemporal factor graph to probabilistically minimize total measurement error using non-linear optimization. FIG. 17 shows a diagrammatic representation of an example spatiotemporal factor graph 1700 that can be used to estimate a 3D trajectory of an object (e.g., including pose and velocity over time). In the example, spatiotemporal factor graph 1700 depicted in FIG. 17, variable values such as the pose and velocity (represented as nodes (1702 and 1704 respectively)) are connected by one or more motion model processes (represented as nodes 1706 along connecting edges). For example, an estimate or prediction for the pose of the UAV 100 and/or other object at time step 1 (i.e., variable X(1)) may be calculated by inputting estimated pose and velocity at a prior time step (i.e., variables X(0) and V(0)) as well as various perception inputs such as stereo depth measurements and camera image measurements via one or more motion models. A spatiotemporal factor model can be combined with an outlier rejection mechanism wherein measurements deviating too far from an estimated distribution are thrown out. In order to estimate a 3D trajectory from measurements at multiple time instants, one or more motion models (or process models) are used to connect the estimated variables between each time step in the factor graph. Such motion models can include any one of constant velocity, zero velocity, decaying velocity, and decaying acceleration. Applied motion models may be based on a classification of a type of object being tracked and/or learned using machine learning techniques. For example, a cyclist is likely to make wide turns at speed, but is not expected to move sideways. Conversely, a small animal such as a dog may exhibit a more unpredictable motion pattern.

Figure 18:
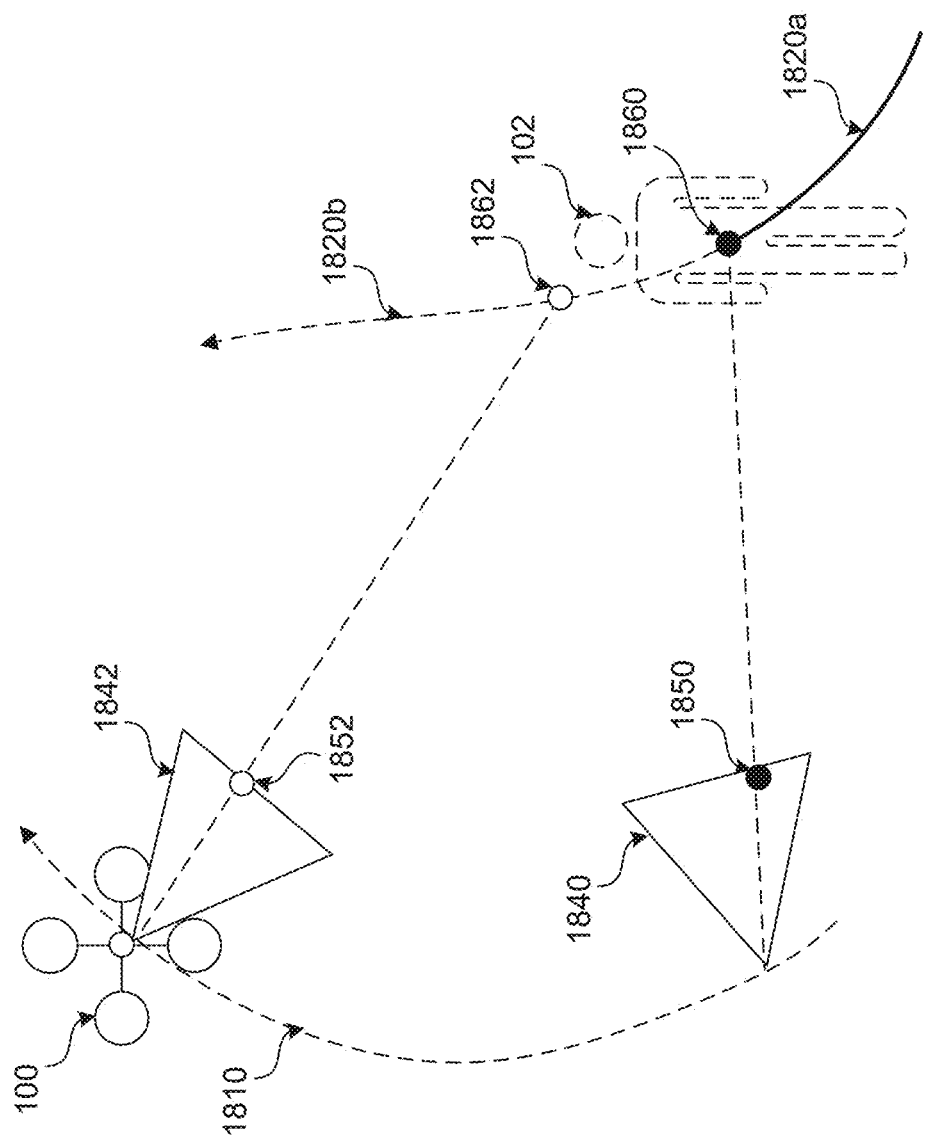
FIG. 18 is a diagram that illustrates an example process of generating an intelligent initial estimate for where a tracked object will appear in a subsequently captured image.

In some embodiments, a tracking system 140 can generate an intelligent initial estimate for where a tracked object will appear in a subsequently captured image based on a predicted 3D trajectory of the object. FIG. 18 shows a diagram that illustrates this concept. As shown in FIG. 18, a UAV 100 is moving along a trajectory 1810 while capturing images of the surrounding physical environment, including of a human subject 102. As the UAV 100 moves along the trajectory 1810, multiple images (e.g., frames of video) are captured from one or more mounted image capture devices 114/115. FIG. 18 shows a first FOV of an image capture device at a first pose 1840 and a second FOV of the image capture device at a second pose 1842. In this example, the first pose 1840 may represent a previous pose of the image capture device at a time instant t(0) while the second pose 1842 may represent a current pose of the image capture device at a time instant t(1). At time instant t(0), the image capture device captures an image of the human subject 102 at a first 3D position 1860 in the physical environment. This first position 1860 may be the last known position of the human subject 102. Given the first pose 1840 of the image capture device, the human subject 102 while at the first 3D position 1860 appears at a first image position 1850 in the captured image. An initial estimate for a second (or current) image position 1852 can therefore be made based on projecting a last known 3D trajectory 1820a of the human subject 102 forward in time using one or more motion models associated with the object. For example, predicted trajectory 1820b shown in FIG. 18 represents this projection of the 3D trajectory 1820a forward in time. A second 3D position 1862 (at time t(1)) of the human subject 102 along this predicted trajectory 1820b can then be calculated based on an amount of time elapsed from t(0) to t(1). This second 3D position 1862 can then be projected into the image plane of the image capture device at the second pose 1842 to estimate the second image position 1852 that will correspond to the human subject 102. Generating such an initial estimate for the position of a tracked object in a newly captured image narrows down the search space for tracking and enables a more robust tracking system, particularly in the case of a UAV 100 and/or tracked object that exhibits rapid changes in position and/or orientation.

In some embodiments, the tracking system 140 can take advantage of two or more types of image capture devices onboard the UAV 100. For example, as previously described with respect to FIG. 1, the UAV 100 may include image capture device 114 configured for visual navigation, as well as an image capture device 115 for capturing images that are to be viewed. The image capture devices 114 may be configured for low-latency, low-resolution, and high FOV, while the image capture device 115 may be configured for high resolution. An array of image capture devices 114 about a perimeter of the UAV 100 can provide low-latency information about objects up to 360 degrees around the UAV 100 and can be used to compute depth using stereo vision algorithms. Conversely, the other image capture device 115 can provide more detailed images (e.g., high resolution, color, etc.) in a limited FOV.

Combining information from both types of image capture devices 114 and 115 can be beneficial for object tracking purposes in a number of ways. First, the high-resolution color information from an image capture device 115 can be fused with depth information from the image capture devices 114 to create a 3D representation of a tracked object. Second, the low-latency of the image capture devices 114 can enable more accurate detection of objects and estimation of object trajectories. Such estimates can be further improved and/or corrected based on images received from a high-latency, high resolution image capture device 115. The image data from the image capture devices 114 can either be fused with the image data from the image capture device 115, or can be used purely as an initial estimate.

By using the image capture devices 114, a tracking system 140 can achieve tracking of objects up to 360 degrees around the UAV 100. The tracking system 140 can fuse measurements from any of the image capture devices 114 or 115 when estimating a relative position and/or orientation of a tracked object as the positions and orientations of the image capture devices 114 and 115 change over time. The tracking system 140 can also orient the image capture device 115 to get more accurate tracking of specific objects of interest, fluidly incorporating information from both image capture modalities. Using knowledge of where all objects in the scene are, the UAV 100 can exhibit more intelligent autonomous flight.

As previously discussed, the high-resolution image capture device 115 may be mounted to an adjustable mechanism such as a gimbal that allows for one or more degrees of freedom of motion relative to the body of the UAV 100. Such a configuration is useful in stabilizing image capture as well as tracking objects of particular interest. An active gimbal mechanism configured to adjust an orientation of a higher-resolution image capture device 115 relative to the UAV 100 so as to track a position of an object in the physical environment may allow for visual tracking at greater distances than may be possible through use of the lower-resolution image capture devices 114 alone. Implementation of an active gimbal mechanism may involve estimating the orientation of one or more components of the gimbal mechanism at any given time. Such estimations may be based on any of hardware sensors coupled to the gimbal mechanism (e.g., accelerometers, rotary encoders, etc.), visual information from the image capture devices 114/115, or a fusion based on any combination thereof.

Figure 19:
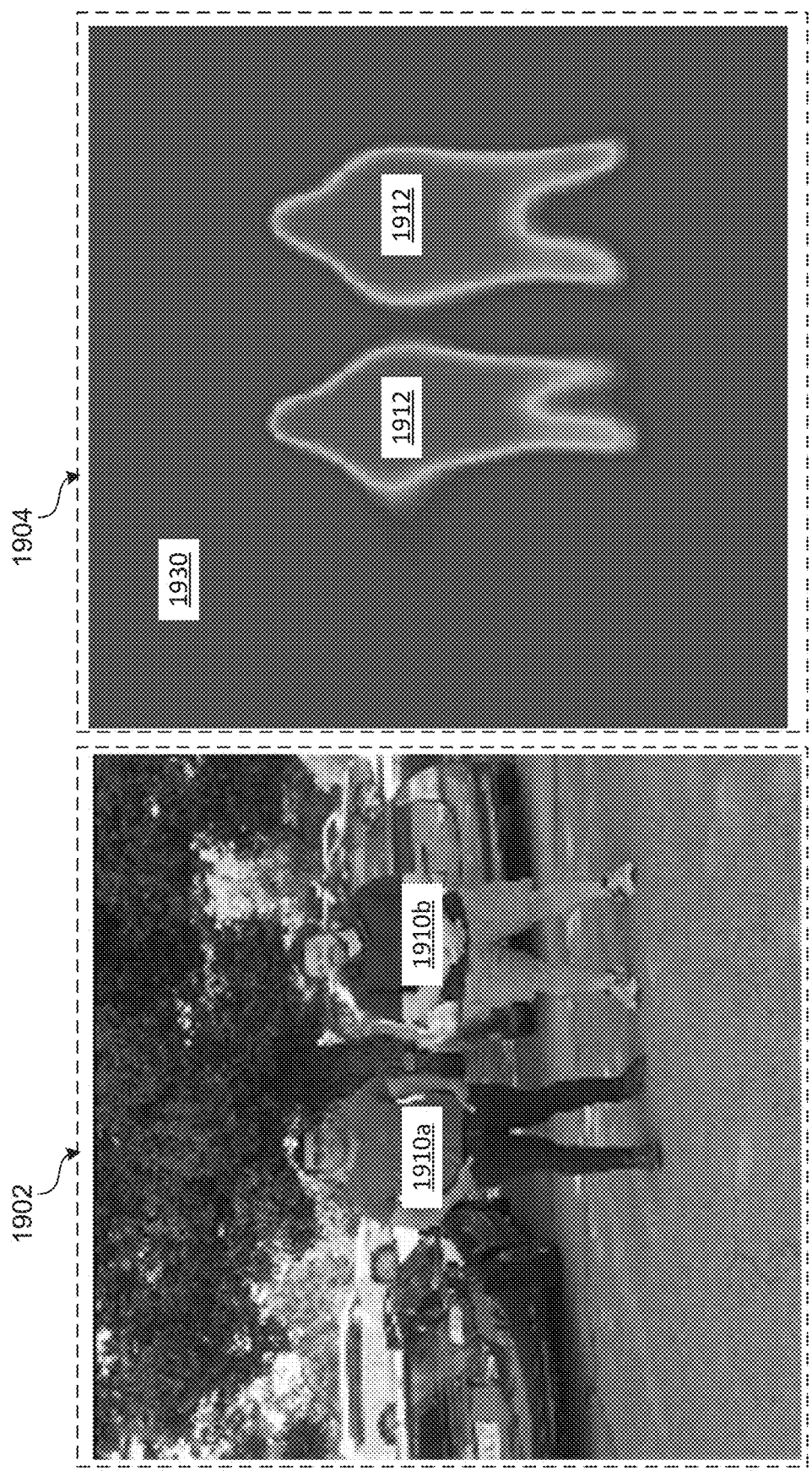
FIG. 19 shows a visualization representative of a dense per-pixel segmentation of a captured image.

A tracking system 140 may include an object detection system for detecting and tracking various objects. Given one or more classes of objects (e.g., humans, buildings, cars, animals, etc.), the object detection system may identify instances of the various classes of objects occurring in captured images of the physical environment. Outputs by the object detection system can be parameterized in a few different ways. In some embodiments, the object detection system processes received images and outputs a dense per-pixel segmentation, where each pixel is associated with a value corresponding to either an object class label (e.g., human, building, car, animal, etc.) and/or a likelihood of belonging to that object class. For example, FIG. 19 shows a visualization 1904 of a dense per-pixel segmentation of a captured image 1902 where pixels corresponding to detected objects 1910a-b classified as humans are set apart from all other pixels in the image 1902. Another parameterization may include resolving the image location of a detected object to a particular image coordinate (e.g., as shown at map 1530 in FIG. 15), for example, based on the centroid of the representation of the object in a received image.

In some embodiments, the object detection system can utilize a deep convolutional neural network for object detection. For example, the input may be a digital image (e.g., image 1902), and the output may be a tensor with the same spatial dimension. Each slice of the output tensor may represent a dense segmentation prediction, where each pixel's value is proportional to the likelihood of that pixel belonging to the class of object corresponding to the slice. For example, the visualization 1904 shown in FIG. 19 may represent a particular slice of the aforementioned tensor where each pixel's value is proportional to the likelihood that the pixel corresponds with a human. In addition, the same deep convolutional neural network can also predict the centroid locations for each detected instance, as described in the following section.

A tracking system 140 may also include an instance segmentation system for distinguishing between individual instances of objects detected by the object detection system. In some embodiments, the process of distinguishing individual instances of detected objects may include processing digital images captured by the UAV 100 to identify pixels belonging to one of a plurality of instances of a class of physical objects present in the physical environment and captured in the digital images. As previously described with respect to FIG. 19, a dense per-pixel segmentation algorithm can classify certain pixels in an image as corresponding to one or more classes of objects. This segmentation process output may allow a tracking system 140 to distinguish the objects represented in an image and the rest of the image (i.e., a background). For example, the visualization 1904 distinguishes pixels that correspond to humans (e.g., included in region 1912) from pixels that do not correspond to humans (e.g., included in region 1930). However, this segmentation process does not necessarily distinguish between individual instances of the detected objects. A human viewing the visualization 1904 may conclude that the pixels corresponding to humans in the detected image actually correspond to two separate humans; however, without further analysis, a tracking system 140 may be unable to make this distinction.

Figure 20:
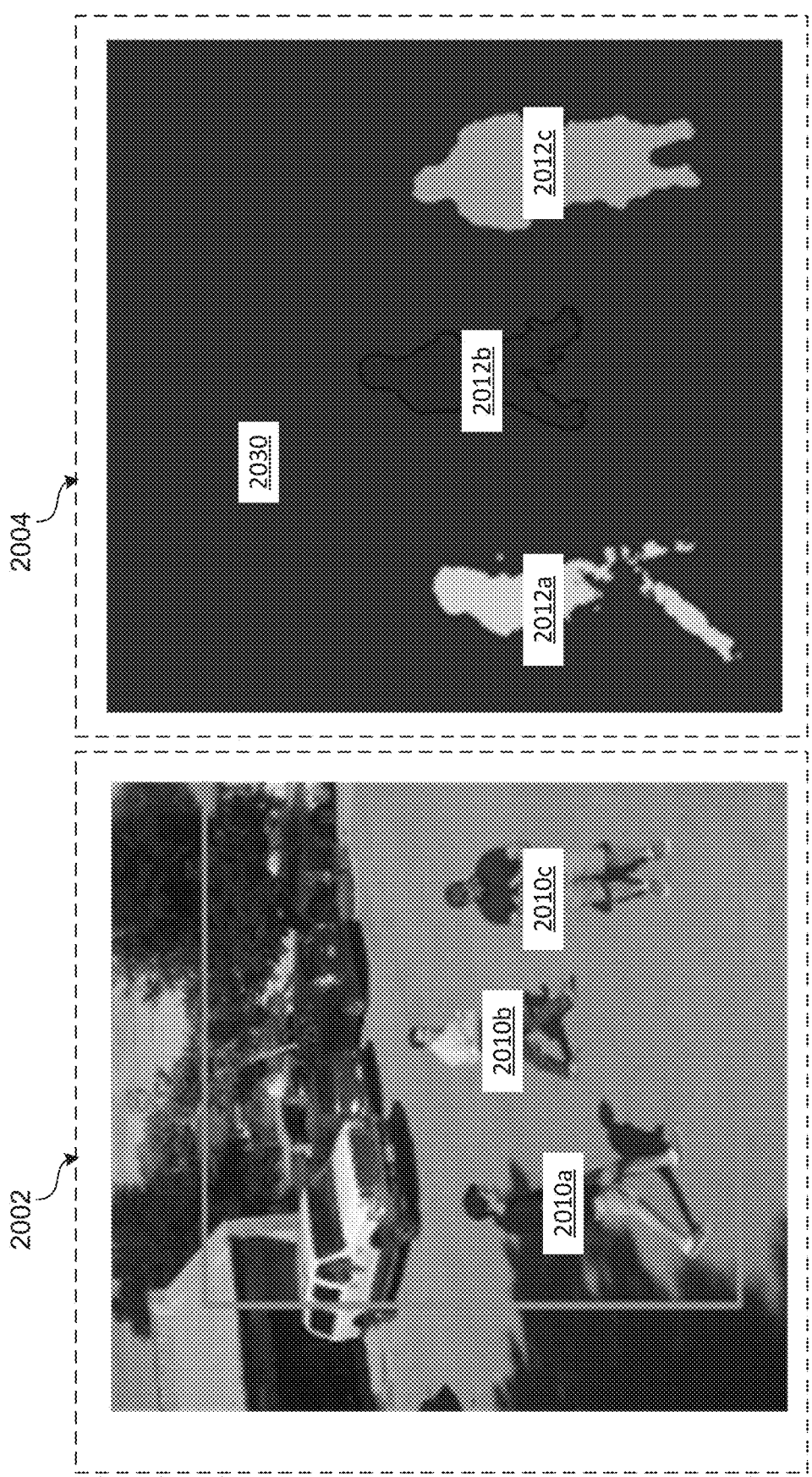
FIG. 20 shows a visualization representative of an instance segmentation of a captured image.

Effective object tracking may involve distinguishing pixels that correspond to distinct instances of detected objects. This process is known as "instance segmentation." FIG. 20 shows an example visualization 2004 of an instance segmentation output based on a captured image 2002. Similar to the dense per-pixel segmentation process described with respect to FIG. 19, the output represented by visualization 2004 distinguishes pixels (e.g., included in regions 2012a-c) that correspond to detected objects 2010a-c of a particular class of objects (in this case humans) from pixels that do not correspond to such objects (e.g., included in region 2030). Notably, the instance segmentation process goes a step further to distinguish pixels corresponding to individual instances of the detected objects from each other. For example, pixels in region 2012a correspond to a detected instance of a human 2010a, pixels in region 2012b correspond to a detected instance of a human 2010b, and pixels in region 2012c correspond to a detected instance of a human 2010c.

Distinguishing between instances of detected objects may be based on an analysis of pixels corresponding to detected objects. For example, a grouping method may be applied by the tracking system 140 to associate pixels corresponding to a particular class of object to a particular instance of that class by selecting pixels that are substantially similar to certain other pixels corresponding to that instance, pixels that are spatially clustered, pixel clusters that fit an appearance-based model for the object class, etc. Again, this process may involve applying a deep convolutional neural network to distinguish individual instances of detected objects.

Instance segmentation may associate pixels corresponding to particular instances of objects; however, such associations may not be temporally consistent. Consider again, the example described with respect to FIG. 20. As illustrated in FIG. 20, a tracking system 140 has identified three instances of a certain class of objects (i.e., humans) by applying an instance segmentation process to a captured image 2002 of the physical environment. This example captured image 2002 may represent only one frame in a sequence of frames of captured video. When a second frame is received, the tracking system 140 may not be able to recognize newly identified object instances as corresponding to the same three people 2010a-c as captured in image 2002.

To address this issue, the tracking system 140 can include an identity recognition system. An identity recognition system may process received inputs (e.g., captured images) to learn the appearances of instances of certain objects (e.g., of particular people). Specifically, the identity recognition system may apply a machine-learning appearance-based model to digital images captured by one or more image capture devices 114/115 associated with a UAV 100. Instance segmentations identified based on processing of captured images can then be compared against such appearance-based models to resolve unique identities for one or more of the detected objects.

Identity recognition can be useful for various different tasks related to object tracking. As previously alluded to, recognizing the unique identities of detected objects allows for temporal consistency. Further, identity recognition can enable the tracking of multiple different objects (as will be described in more detail). Identity recognition may also facilitate object persistence that enables re-acquisition of previously tracked objects that fell out of view due to limited FOV of the image capture devices, motion of the object, and/or occlusion by another object. Identity recognition can also be applied to perform certain identity-specific behaviors or actions, such as recording video when a particular person is in view.

In some embodiments, an identity recognition process may employ a deep convolutional neural network to learn one or more effective appearance-based models for certain objects. In some embodiments, the neural network can be trained to learn a distance metric that returns a low distance value for image crops belonging to the same instance of an object (e.g., a person), and a high distance value otherwise.

In some embodiments, an identity recognition process may also include learning appearances of individual instances of objects such as people. When tracking humans, a tracking system 140 may be configured to associate identities of the humans, either through user-input data or external data sources such as images associated with individuals available on social media. Such data can be combined with detailed facial recognition processes based on images received from any of the one or more image capture devices 114/115 onboard the UAV 100. In some embodiments, an identity recognition process may focus on one or more key individuals. For example, a tracking system 140 associated with a UAV 100 may specifically focus on learning the identity of a designated owner of the UAV 100 and retain and/or improve its knowledge between flights for tracking, navigation, and/or other purposes such as access control.

In some embodiments, a tracking system 140 may be configured to focus tracking on a specific object detected in captured images. In such a single-object tracking approach, an identified object (e.g., a person) is designated for tracking while all other objects (e.g., other people, trees, buildings, landscape features, etc.) are treated as distractors and ignored. While useful in some contexts, a single-object tracking approach may have some disadvantages. For example, an overlap in trajectory, from the point of view of an image capture device, of a tracked object and a distractor object may lead to an inadvertent switch in the object being tracked such that the tracking system 140 begins tracking the distractor instead. Similarly, spatially close false positives by an object detector can also lead to inadvertent switches in tracking.

A multi-object tracking approach addresses these shortcomings and introduces a few additional benefits. In some embodiments, a unique track is associated with each object detected in the images captured by the one or more image capture devices 114/115. In some cases, it may not be practical, from a computing standpoint, to associate a unique track with every single object that is captured in the images. For example, a given image may include hundreds of objects, including minor features such as rocks or leaves or trees. Instead, unique tracks may be associated with certain classes of objects that may be of interest from a tracking standpoint. For example, the tracking system 140 may be configured to associate a unique track with every object detected that belongs to a class that is generally mobile (e.g., people, animals, vehicles, etc.).

Each unique track may include an estimate for the spatial location and movement of the object being tracked (e.g., using the spatiotemporal factor graph described earlier) as well as its appearance (e.g., using the identity recognition feature). Instead of pooling together all other distractors (i.e., as may be performed in a single object tracking approach), the tracking system 140 can learn to distinguish between the multiple individual tracked objects. By doing so, the tracking system 140 may render inadvertent identity switches less likely. Similarly, false positives by the object detector can be more robustly rejected as they will tend to not be consistent with any of the unique tracks.

An aspect to consider when performing multi-object tracking includes the association problem. In other words, given a set of object detections based on captured images (including parameterization by 3D location and regions in the image corresponding to segmentation), an issue arises regarding how to associate each of the set of object detections with corresponding tracks. To address the association problem, the tracking system 140 can be configured to associate one of a plurality of detected objects with one of a plurality of estimated object tracks based on a relationship between a detected object and an estimate object track. Specifically, this process may involve computing a "cost" value for one or more pairs of object detections and estimate object tracks. The computed cost values can take into account, for example, the spatial distance between a current location (e.g., in 3D space and/or image space) of a given object detection and a current estimate of a given track (e.g., in 3D space and/or in image space), an uncertainty of the current estimate of the given track, a difference between a given detected object's appearance and a given track's appearance estimate, and/or any other factors that may tend to suggest an association between a given detected object and given track. In some embodiments, multiple cost values are computed based on various different factors and fused into a single scalar value that can then be treated as a measure of how well a given detected object matches a given track. The aforementioned cost formulation can then be used to determine an optimal association between a detected object and a corresponding track by treating the cost formulation as an instance of a minimum cost perfect bipartite matching problem, which can be solved using, for example, the Hungarian algorithm.

In some embodiments, effective object tracking by a tracking system 140 may be improved by incorporating information regarding a state of an object. For example, a detected object such as a human may be associated with any one or more defined states. A state in this context may include an activity by the object such as sitting, standing, walking, running, or jumping. In some embodiments, one or more perception inputs (e.g., visual inputs from image capture devices 114/115) may be used to estimate one or more parameters associated with detected objects. The estimated parameters may include an activity type, motion capabilities, trajectory heading, contextual location (e.g., indoors vs. outdoors), interaction with other detected objects (e.g., two people walking together, a dog on a leash held by a person, a trailer pulled by a car, etc.), and any other semantic attributes.

Generally, object state estimation may be applied to estimate one or more parameters associated with a state of a detected object based on perception inputs (e.g., images of the detected object captured by one or more image capture devices 114/115 onboard a UAV 100 or sensor data from any other sensors onboard the UAV 100). The estimated parameters may then be applied to assist in predicting the motion of the detected object and thereby assist in tracking the detected object. For example, future trajectory estimates may differ for a detected human depending on whether the detected human is walking, running, jumping, riding a bicycle, riding in a car, etc. In some embodiments, deep convolutional neural networks may be applied to generate the parameter estimates based on multiple data sources (e.g., the perception inputs) to assist in generating future trajectory estimates and thereby assist in tracking.

As previously alluded to, a tracking system 140 may be configured to estimate (i.e., predict) a future trajectory of a detected object based on past trajectory measurements and/or estimates, current perception inputs, motion models, and any other information (e.g., object state estimates). Predicting a future trajectory of a detected object is particularly useful for autonomous navigation by the UAV 100. Effective autonomous navigation by the UAV 100 may depend on anticipation of future conditions just as much as current conditions in the physical environment. Through a motion planning process, a navigation system of the UAV 100 may generate control commands configured to cause the UAV 100 to maneuver, for example, to avoid a collision, maintain separation with a tracked object in motion, and/or satisfy any other navigation objectives.

Predicting a future trajectory of a detected object is generally a relatively difficult problem to solve. The problem can be simplified for objects that are in motion according to a known and predictable motion model. For example, an object in free fall is expected to continue along a previous trajectory while accelerating at rate based on a known gravitational constant and other known factors (e.g., wind resistance). In such cases, the problem of generating a prediction of a future trajectory can be simplified to merely propagating past and current motion according to a known or predictable motion model associated with the object. Objects may of course deviate from a predicted trajectory generated based on such assumptions for a number of reasons (e.g., due to collision with another object). However, the predicted trajectories may still be useful for motion planning and/or tracking purposes.

Dynamic objects, such as people and animals, present a more difficult challenge when predicting future trajectories because the motion of such objects is generally based on the environment and their own free will. To address such challenges, a tracking system 140 may be configured to take accurate measurements of the current position and motion of an object and use differentiated velocities and/or accelerations to predict a trajectory a short time (e.g., seconds) into the future and continually update such prediction as new measurements are taken. Further, the tracking system 140 may also use semantic information gathered from an analysis of captured images as cues to aid in generating predicted trajectories. For example, a tracking system 140 may determine that a detected object is a person on a bicycle traveling along a road. With this semantic information, the tracking system 140 may form an assumption that the tracked object is likely to continue along a trajectory that roughly coincides with a path of the road. As another related example, the tracking system 140 may determine that the person has begun turning the handlebars of the bicycle to the left. With this semantic information, the tracking system 140 may form an assumption that the tracked object will likely turn to the left before receiving any positional measurements that expose this motion. Another example, particularly relevant to autonomous objects such as people or animals is to assume that that the object will tend to avoid collisions with other objects. For example, the tracking system 140 may determine a tracked object is a person heading on a trajectory that will lead to a collision with another object such as a light pole. With this semantic information, the tracking system 140 may form an assumption that the tracked object is likely to alter its current trajectory at some point before the collision occurs. A person having ordinary skill will recognize that these are only examples of how semantic information may be utilized as a cue to guide prediction of future trajectories for certain objects.

In addition to performing an object detection process in one or more captured images per time frame, the tracking system 140 may also be configured to perform a frame-to-frame tracking process, for example, to detect motion of a particular set or region of pixels in images at subsequent time frames (e.g., video frames). Such a process may involve applying a mean-shift algorithm, a correlation filter, and/or a deep network. In some embodiments, frame-to-frame tracking may be applied by a system that is separate from an object detection system wherein results from the frame-to-frame tracking are fused into a spatiotemporal factor graph. Alternatively, or in addition, an object detection system may perform frame-to-frame tracking if, for example, the system has sufficient available computing resources (e.g., memory). For example, an object detection system may apply frame-to-frame tracking through recurrence in a deep network and/or by passing in multiple images at a time. A frame-to-frame tracking process and object detection process can also be configured to complement each other, with one resetting the other when a failure occurs.

As previously discussed, the tracking system 140 may be configured to process images (e.g., the raw pixel data) received from one or more image capture devices 114/115 onboard a UAV 100. Alternatively, or in addition, the tracking system 140 may also be configured to operate by processing disparity images. Such a disparity image will tend to highlight regions of an image that correspond to objects in the physical environment since the pixels corresponding to the object will have similar disparities due to the object's 3D location in space. Accordingly, a disparity image, that may have been generated by processing two or more images according to a separate stereo algorithm, may provide useful cues to guide the tracking system 140 in detecting objects in the physical environment. In many situations, particularly where harsh lighting is present, a disparity image may actually provide stronger cues about the location of objects than an image captured from the image capture devices 114/115. As mentioned, disparity images may be computed with a separate stereo algorithm. Alternatively, or in addition, disparity images may be output as part of the same deep network applied by the tracking system 140. Disparity images may be used for object detection separately from the images received from the image capture devices 114/115, or they may be combined into a single network for joint inference.

In general, a tracking system 140 (e.g., including an object detection system and/or an associated instance segmentation system) may be primarily concerned with determining which pixels in a given image correspond to each object instance. However, these systems may not consider portions of a given object that are not actually captured in a given image. For example, pixels that would otherwise correspond with an occluded portion of an object (e.g., a person partially occluded by a tree) may not be labeled as corresponding to the object. This can be disadvantageous for object detection, instance segmentation, and/or identity recognition because the size and shape of the object may appear in the captured image to be distorted due to the occlusion. To address this issue, the tracking system 140 may be configured to imply a segmentation of an object instance in a captured image even if that object instance is occluded by other object instances. The object tracking system 140 may additionally be configured to determine which of the pixels associated with an object instance correspond with an occluded portion of that object instance. This process is generally referred to as "amodal segmentation" in that the segmentation process takes into consideration the whole of a physical object even if parts of the physical object are not necessarily perceived, for example, received images captured by the image capture devices 114/115. Amodal segmentation may be particularly advantageous when performing identity recognition and in a tracking system 140 configured for multi-object tracking.

Loss of visual contact is to be expected when tracking an object in motion through a physical environment. A tracking system 140 based primarily on visual inputs (e.g., images captured by image capture devices 114/115) may lose a track on an object when visual contact is lost (e.g., due to occlusion by another object or by the object leaving a FOV of image capture devices 114/115). In such cases, the tracking system 140 may become uncertain of the object's location and thereby declare the object lost. Human pilots generally do not have this issue, particularly in the case of momentary occlusions, due to the notion of object permanence. Object permanence assumes that, given certain physical constraints of matter, an object cannot suddenly disappear or instantly teleport to another location. Based on this assumption, if it is clear that all escape paths would have been clearly visible, then an object is likely to remain in an occluded volume. This situation is most clear when there is a single occluding object (e.g., boulder) on flat ground with free space all around. If a tracked object in motion suddenly disappears in the captured image at a location of another object (e.g., the bolder), then it can be assumed that the object remains at a position occluded by the other object and that the tracked object will emerge along one of one or more possible escape paths. In some embodiments, the tracking system 140 may be configured to implement an algorithm that bounds the growth of uncertainty in the tracked object's location given this concept. In other words, when visual contact with a tracked object is lost at a particular position, the tracking system 140 can bound the uncertainty in the object's position to the last observed position and one or more possible escape paths given a last observed trajectory. A possible implementation of this concept may include generating, by the tracking system 140, an occupancy map that is carved out by stereo and the segmentations with a particle filter on possible escape paths.

Unmanned Aerial Vehicle—Example System

A UAV 100, according to the present teachings, may be implemented as any type of UAV. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors, but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will, therefore, accelerate the craft forward on a horizontal plane.

Figure 21:
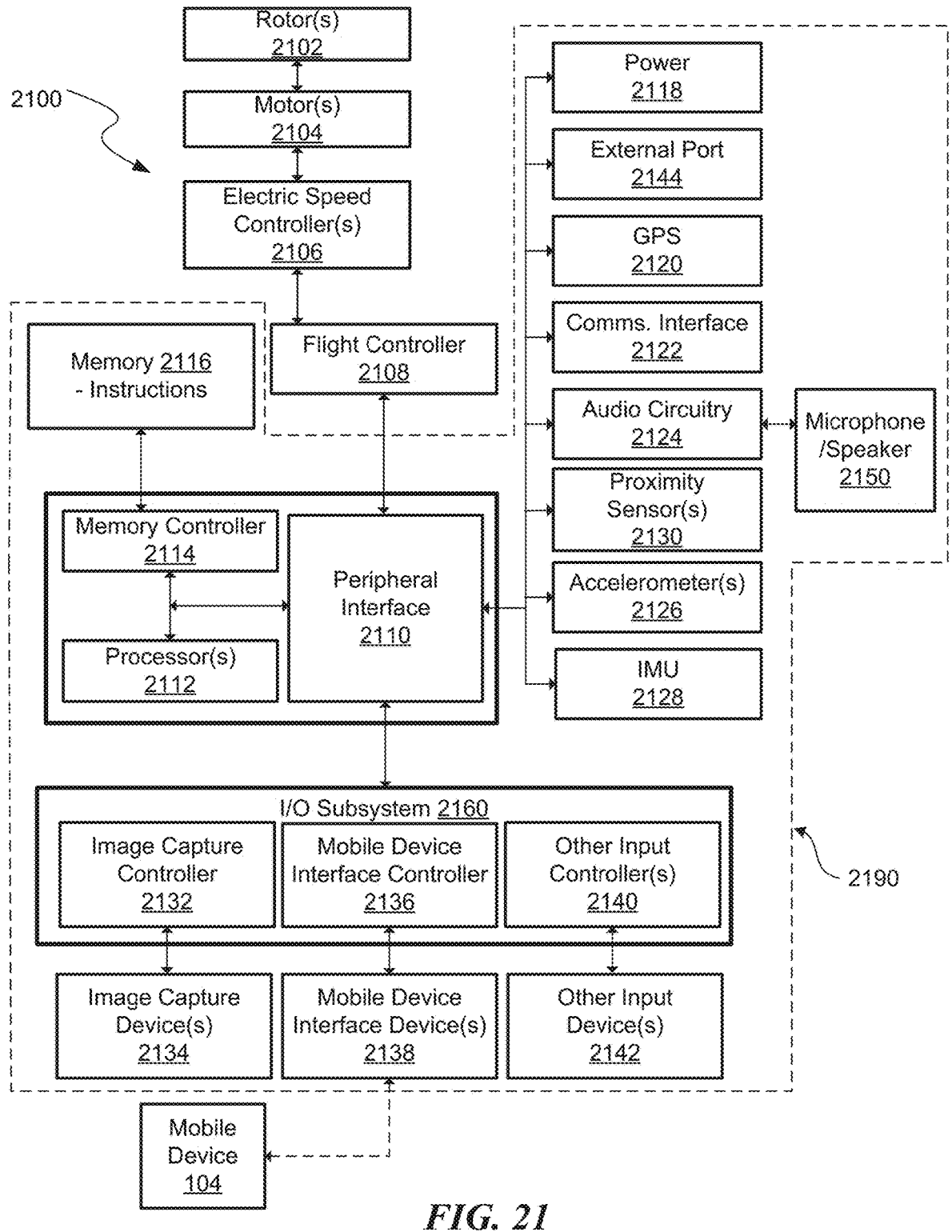
FIG. 21 is a block diagram of an example UAV system including various functional system components with which at least some operations described in this disclosure can be implemented.

FIG. 21 shows a diagram of an example UAV system 2100 including various functional system components that may be part of a UAV 100, according to some embodiments. UAV system 2100 may include one or more propulsion systems (e.g., rotors 2102 and motor(s) 2104), one or more electronic speed controllers 2106, a flight controller 2108, a peripheral interface 2110, processor(s) 2112, a memory controller 2114, a memory 2116 (which may include one or more computer-readable storage media), a power module 2118, a GPS module 2120, a communications interface 2122, audio circuitry 2124, an accelerometer 2126 (including subcomponents, such as gyroscopes), an IMU 2128, a proximity sensor 2130, an optical sensor controller 2132 and associated optical sensor(s) 2134, a mobile device interface controller 2136 with associated interface device(s) 2138, and any other input controllers 2140 and input device(s) 2142, for example, display controllers with associated display device(s). These components may communicate over one or more communication buses or signal lines as represented by the arrows in FIG. 21.

UAV system 2100 is only one example of a system that may be part of a UAV 100. A UAV 100 may include more or fewer components than shown in system 2100, may combine two or more components as functional units, or may have a different configuration or arrangement of the components. Some of the various components of system 2100 shown in FIG. 21 may be implemented in hardware, software or a combination of both hardware and software, including one or more signal processing and/or application specific integrated circuits. Also, UAV 100 may include an off-the-shelf UAV (e.g., a currently available remote-controlled quadcopter) coupled with a modular add-on device (for example, one including components within outline 2190) to perform the innovative functions described in this disclosure.

A propulsion system (e.g., comprising components 2102-2104) may comprise fixed-pitch rotors. The propulsion system may also include variable-pitch rotors (for example, using a gimbal mechanism), a variable-pitch jet engine, or any other mode of propulsion having the effect of providing force. The propulsion system may vary the applied thrust, for example, by using an electronic speed controller 2106 to vary the speed of each fixed-pitch rotor.

Flight controller 2108 may include a combination of hardware and/or software configured to receive input data (e.g., sensor data from image capture devices 2134, generated trajectories from an autonomous navigation system 120, or any other inputs), interpret the data and output control commands to the propulsion systems 2102-2106 and/or aerodynamic surfaces (e.g., fixed wing control surfaces) of the UAV 100. Alternatively, or in addition, a flight controller 2108 may be configured to receive control commands generated by another component or device (e.g., processors 2112 and/or a separate computing device), interpret those control commands and generate control signals to the propulsion systems 2102-2106 and/or aerodynamic surfaces (e.g., fixed wing control surfaces) of the UAV 100. In some embodiments, the previously mentioned navigation system 120 of the UAV 100 may comprise the flight controller 2108 and/or any one or more of the other components of system 2100. Alternatively, the flight controller 2108 shown in FIG. 21 may exist as a component separate from the navigation system 120, for example, similar to the flight controller 160 shown in FIG. 2.

Memory 2116 may include high-speed random-access memory and may also include non-volatile memory, such as one or more magnetic disk storage devices, flash memory devices, or other non-volatile solid-state memory devices. Access to memory 2116 by other components of system 2100, such as the processors 2112 and the peripherals interface 2110, may be controlled by the memory controller 2114.

The peripherals interface 2110 may couple the input and output peripherals of system 2100 to the processor(s) 2112 and memory 2116. The one or more processors 2112 run or execute various software programs and/or sets of instructions stored in memory 2116 to perform various functions for the UAV 100 and to process data. In some embodiments, processors 2112 may include general central processing units (CPUs), specialized processing units such as graphical processing units (GPUs) particularly suited to parallel processing applications, or any combination thereof. In some embodiments, the peripherals interface 2110, the processor(s) 2112, and the memory controller 2114 may be implemented on a single integrated chip. In some other embodiments, they may be implemented on separate chips.

The network communications interface 2122 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 2124, including the speaker and microphone 2150, may provide an audio interface between the surrounding environment and the UAV 100. The audio circuitry 2124 may receive audio data from the peripherals interface 2110, convert the audio data to an electrical signal, and transmit the electrical signal to the speaker 2150. The speaker 2150 may convert the electrical signal to human-audible sound waves. The audio circuitry 2124 may also receive electrical signals converted by the microphone 2150 from sound waves. The audio circuitry 2124 may convert the electrical signal to audio data and transmit the audio data to the peripherals interface 2110 for processing. Audio data may be retrieved from and/or transmitted to memory 2116 and/or the network communications interface 2122 by the peripherals interface 2110.

The I/O subsystem 2160 may couple input/output peripherals of UAV 100, such as an optical sensor system 2134, the mobile device interface 2138, and other input/control devices 2142, to the peripherals interface 2110. The I/O subsystem 2160 may include an optical sensor controller 2132, a mobile device interface controller 2136, and other input controller(s) 2140 for other input or control devices. The one or more input controllers 2140 receive/send electrical signals from/to other input or control devices 2142.

The other input/control devices 2142 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to a user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 2116) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use liquid crystal display (LCD) technology, or light emitting polymer display (LPD) technology, although other display technologies may be used in other embodiments. The touch screen and the display controller may detect contact and any movement or breaking thereof using any of a plurality of touch sensing technologies now known or later developed, including, but not limited to, capacitive, resistive, infrared, and surface acoustic wave technologies, as well as other proximity sensor arrays or other elements for determining one or more points of contact with a touch screen.

The mobile device interface device 2138 along with mobile device interface controller 2136 may facilitate the transmission of data between a UAV 100 and other computing devices such as a mobile device 104. According to some embodiments, communications interface 2122 may facilitate the transmission of data between UAV 100 and a mobile device 104 (for example, where data is transferred over a Wi-Fi network).

UAV system 2100 also includes a power system 2118 for powering the various components. The power system 2118 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV system 2100 may also include one or more image capture devices 2134. Image capture devices 2134 may be the same as the image capture devices 114/115 of UAV 100 described with respect to FIG. 1. FIG. 21 shows an image capture device 2134 coupled to an image capture controller 2132 in I/O subsystem 2160. The image capture device 2134 may include one or more optical sensors. For example, image capture device 2134 may include a charge-coupled device (CCD) or complementary metal-oxide semiconductor (CMOS) phototransistors. The optical sensors of image capture devices 2134 receive light from the environment, projected through one or more lenses (the combination of an optical sensor and lens can be referred to as a "camera") and converts the light to data representing an image. In conjunction with an imaging module located in memory 2116, the image capture device 2134 may capture images (including still images and/or video). In some embodiments, an image capture device 2134 may include a single fixed camera. In other embodiments, an image capture device 2140 may include a single adjustable camera (adjustable using a gimbal mechanism with one or more axes of motion). In some embodiments, an image capture device 2134 may include a camera with a wide-angle lens providing a wider FOV. In some embodiments, an image capture device 2134 may include an array of multiple cameras providing up to a full 360 degree view in all directions. In some embodiments, an image capture device 2134 may include two or more cameras (of any type as described herein) placed next to each other in order to provide stereoscopic vision. In some embodiments, an image capture device 2134 may include multiple cameras of any combination as described above. In some embodiments, the cameras of an image capture device 2134 may be arranged such that at least two cameras are provided with overlapping FOV at multiple angles around the UAV 100, thereby allowing for stereoscopic (i.e., 3D) image/video capture and depth recovery (e.g., through computer vision algorithms) at multiple angles around UAV 100.

For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 2100 may also include one or more proximity sensors 2130. FIG. 21 shows a proximity sensor 2130 coupled to the peripherals interface 2110. Alternately, the proximity sensor 2130 may be coupled to an input controller 2140 in the I/O subsystem 2160. Proximity sensors 2130 may generally include remote sensing technology for proximity detection, range measurement, target identification, etc. For example, proximity sensors 2130 may include radar, sonar, and LIDAR.

UAV system 2100 may also include one or more accelerometers 2126. FIG. 21 shows an accelerometer 2126 coupled to the peripherals interface 2110. Alternately, the accelerometer 2126 may be coupled to an input controller 2140 in the I/O subsystem 2160.

UAV system 2100 may include one or more IMU 2128. An IMU 2128 may measure and report the UAV's velocity, acceleration, orientation, and gravitational forces using a combination of gyroscopes and accelerometers (e.g., accelerometer 2126).

UAV system 2100 may include a global positioning system (GPS) receiver 2120. FIG. 21 shows a GPS receiver 2120 coupled to the peripherals interface 2110. Alternately, the GPS receiver 2120 may be coupled to an input controller 2140 in the I/O subsystem 2160. The GPS receiver 2120 may receive signals from GPS satellites in orbit around the earth, calculate a distance to each of the GPS satellites (through the use of GPS software), and thereby pinpoint a current global position of UAV 100.

In some embodiments, the software components stored in memory 2116 may include an operating system, a communication module (or set of instructions), a flight control module (or set of instructions), a localization module (or set of instructions), a computer vision module (or set of instructions), a graphics module (or set of instructions), and other applications (or sets of instructions). For clarity, one or more modules and/or applications may not be shown in FIG. 21.

An operating system (e.g., Darwin™, RTXC, Linux™, Unix™, Apple™ OS X, Microsoft Windows™, or an embedded operating system such as VxWorks™) includes various software components and/or drivers for controlling and managing general system tasks (e.g., memory management, storage device control, power management, etc.) and facilitates communication between various hardware and software components.

A communications module may facilitate communication with other devices over one or more external ports 2144 and may also include various software components for handling data transmission via the network communications interface 2122. The external port 2144 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including, without limitation, text, still images, videos, animations, icons (such as user-interface objects including soft keys), and the like. The graphics module in conjunction with a graphics processing unit (GPU) 2112 may process in real time or near real time, graphics data captured by optical sensor(s) 2134 and/or proximity sensors 2130.

A computer vision module, which may be a component of a graphics module, provides analysis and recognition of a graphics data. For example, while UAV 100 is in flight, the computer vision module along with a graphics module (if separate), GPU 2112, and image capture devices(s) 2134 and/or proximity sensors 2130 may recognize and track the captured image of an object located on the ground. The computer vision module may further communicate with a localization/navigation module and flight control module to update a position and/or orientation of the UAV 100 and to provide course corrections to fly along a planned trajectory through a physical environment.

A localization/navigation module may determine the location and/or orientation of UAV 100 and provide this information for use in various modules and applications (e.g., to a flight control module in order to generate commands for use by the flight controller 2108).

Image capture devices(s) 2134, in conjunction with an image capture device controller 2132 and a graphics module, may be used to capture images (including still images and video) and store them into memory 2116.

The above identified modules and applications each correspond to a set of instructions for performing one or more functions described above. These modules (i.e., sets of instructions) need not be implemented as separate software programs, procedures or modules, and, thus, various subsets of these modules may be combined or otherwise re-arranged in various embodiments. In some embodiments, memory 2116 may store a subset of the modules and data structures identified above. Furthermore, memory 2116 may store additional modules and data structures not described above.

Example Computer Processing System

Figure 22:
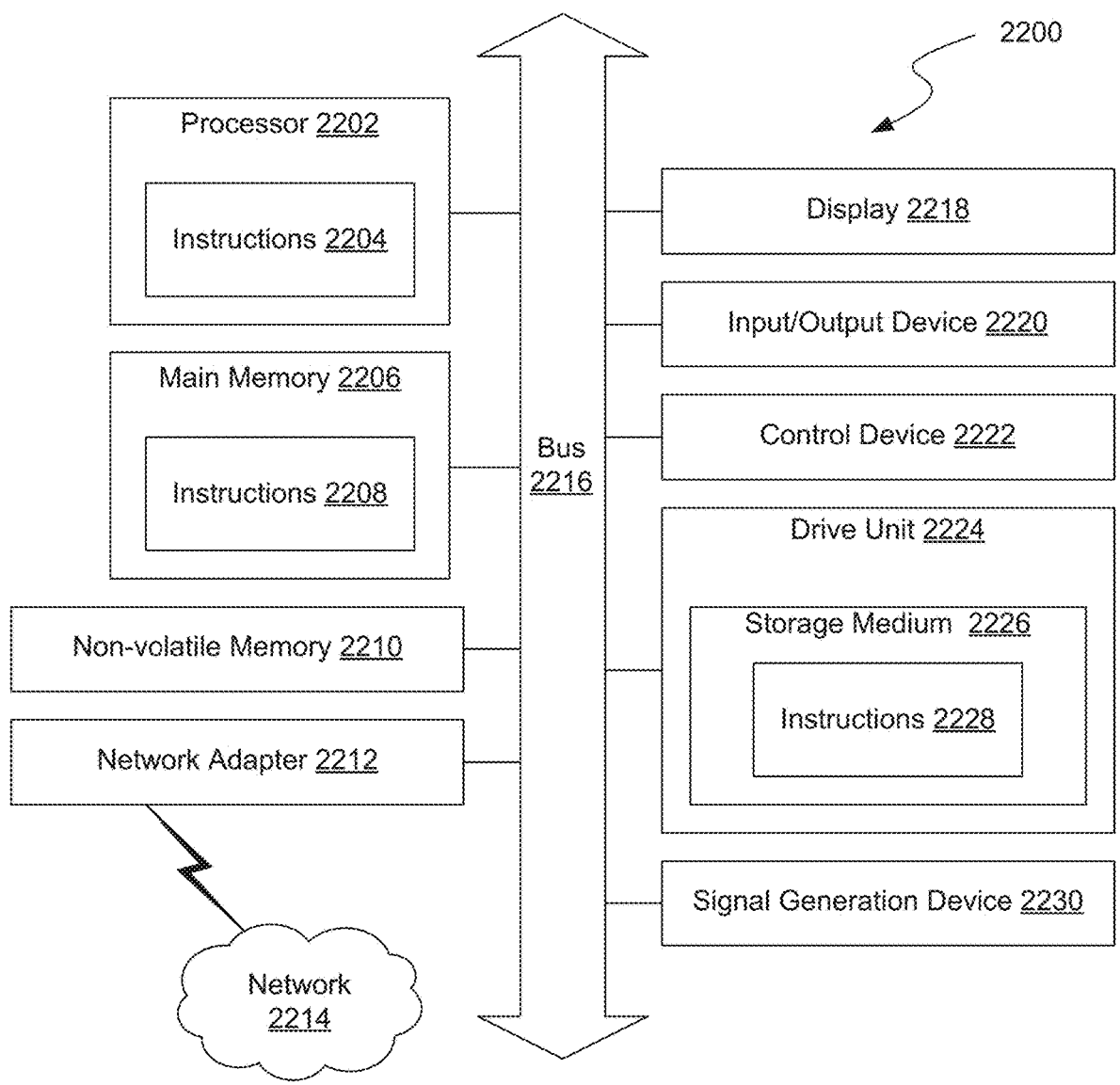
FIG. 22 is a block diagram of an example of a processing system in which at least some operations described in this disclosure can be implemented.

FIG. 22 is a block diagram illustrating an example of a computer processing system 2200 in which at least some operations described in this disclosure can be implemented. The example computer processing system 2200 may be part of any of the aforementioned devices including, but not limited to, UAV 100 and mobile device 104. The processing system 2200 may include one or more central processing units ("processors") 2202, main memory 2206, non-volatile memory 2210, network adapter 2212 (e.g., network interfaces), display 2218, input/output devices 2220, control device 2222 (e.g., keyboard and pointing devices), drive unit 2224 including a storage medium 2226, and signal generation device 2230 that are communicatively connected to a bus 2216. The bus 2216 is illustrated as an abstraction that represents any one or more separate physical buses, point-to-point connections, or both connected by appropriate bridges, adapters, or controllers. The bus 2216, therefore, can include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

While the main memory 2206, non-volatile memory 2210, and storage medium 2226 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 2228. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure may be implemented as part of an operating system or a specific application, component, program, object, module, or sequence of instructions referred to as "computer programs." The computer programs typically comprise one or more instructions (e.g., instructions 2204, 2208, 2228) set at various times in various memory and storage devices in a computer, and that, when read and executed by one or more processing units or processors 2202, cause the processing system 2200 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 2210, floppy and other removable disks, hard disk drives, optical discs (e.g., Compact Disk Read-Only Memory (CD-ROMS), Digital Versatile Disks (DVDs)), and transmission type media such as digital and analog communication links.

The network adapter 2212 enables the computer processing system 2200 to mediate data in a network 2214 with an entity that is external to the computer processing system 2200, such as a network appliance, through any known and/or convenient communications protocol supported by the computer processing system 2200 and the external entity. The network adapter 2212 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 2212 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above, or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of for landing an unmanned aerial vehicle (UAV), the method comprising:
   estimating, by a processor based on perception inputs, external forces and/or external torques acting on the UAV while the UAV is descending to land on a physical surface in a physical environment;
   determining, by the processor based on the estimated external forces and/or external torques, that the UAV is in contact with the physical surface;
   generating, by the processor, a first control command configured to cause a propulsion system of the UAV to gradually reduce thrust over a period of time;
   monitoring, by the processor, changes in the estimated external forces and/or external torques as the propulsion system gradually reduces thrust over the period of time;
   determining, by the processor based on the monitoring that the UAV is supported by the physical surface; and
   generating, by the processor, a second control command configured to cause the propulsion system to power down in response to determining that the UAV is supported by the physical surface.

2. The method of claim 1, wherein the perception inputs include sensor data from sensors onboard the UAV.

3. The method of claim 1, wherein the perception inputs include data output by any one or more of:
   an image capture device onboard the UAV;
   an accelerometer onboard the UAV;
   a gyroscope onboard the UAV;
   an inertial measurement unit (IMU) onboard the UAV;
   a state observer; or
   the propulsion system.

4. The method of claim 1, wherein the perception inputs do not include data from a tactile force sensor.

5. The method of claim 1, wherein the perception inputs include sensor data from sensors onboard the UAV, the method further comprising:
   processing the sensor data to generate semantic information associated with the physical environment; and
   adjusting a parameter used to determine that the UAV is supported by the physical surface based on the semantic information.

6. The method of claim 1, wherein determining that the UAV is supported by the physical surface includes processing information regarding the changes in the estimated external forces and/or external torques using a machine learning model.

7. The method of claim 6, further comprising:
   training the machine learning model based on data gathered by the UAV during one or more previous landings.

8. The method of claim 1, wherein the processor begins estimating the external forces and/or external torques acting on the UAV in response to determining that the UAV is within a threshold proximity to the physical surface in the physical environment.

9. The method of claim 1, wherein estimating the external forces and/or external torques acting on the UAV includes estimating a magnitude and location on a body of the UAV where the external forces and/or external torques are applied.

10. The method of claim 1, further comprising:
    continuing to monitor, by the processor, changes in the estimated external forces and/or external torques after the propulsion system has powered down;
    detecting, by the processor, based on the continued monitoring, that the UAV is no longer supported by the physical surface; and
    generating, by the processor, a third control command configured to cause the propulsion system to power up to cause the UAV to take off.

11. The method of claim 1, wherein estimating the external forces and/or external torques acting on the UAV is further based on one or more physical properties of the UAV.

12. The method of claim 1, wherein determining that the UAV is supported by the physical surface includes determining whether the physical surface is a ground surface in the physical environment or a hand of a person that has caught the UAV.

13. The method of claim 1, further comprising:
    before landing, receiving, by the processor, an input indicative of a user selection of a type of physical surface that the UAV will land on; and
    adjusting, by the processor, a parameter that is applied when determining that the UAV is supported by the physical surface based on the input.

14. The method of claim 13, wherein the parameter is associated with a machine learning model that is used to process information regarding the changes in the estimated external forces and/or external torques acting on the UAV.

15. The method of claim 13, wherein the type of physical surface is selected from a list that includes: a substantially level surface, a sloped surface, or a moving surface.

16. The method of claim 1, wherein generating any of the first control command or the second control command includes:
    generating a behavioral objective; and
    inputting the behavioral objective into a motion planner configured to process a plurality of behavioral objectives to generate a planned trajectory;
    wherein the first control command and/or second control command are generated based on the planned trajectory.

17. An unmanned aerial vehicle (UAV) comprising:
    a propulsion system;
    a sensor device; and
    a navigation system communicatively coupled to the sensor device and the propulsion system, the navigation system configured to:
       to estimate, based on sensor data received from the sensor device, external forces and/or external torques acting on the UAV while the UAV is in flight through a physical environment;

determine, based on the estimated external forces and/or external torques, that the UAV is in contact with a physical surface in the physical environment;

cause the propulsion system to gradually reduce thrust over a period of time;

monitor changes in the estimated external forces and/or external torques as the propulsion system gradually reduces thrust over the period of time;

determine, based on the monitoring, that the UAV is supported by the physical surface; and cause the propulsion system to power down in response to determining that the UAV is supported by the physical surface.

18. The UAV of claim 17, wherein the sensor device includes any of:
an image capture device;
an accelerometer;
a gyroscope;
an inertial measurement unit (IMU); or
a current sensor coupled to the propulsion system.

19. The UAV of claim 17, wherein the sensor device is not a tactile force sensor.

20. The UAV of claim 17, wherein to estimate the external forces and/or external torques acting on the UAV, the navigation system is configured to:
process semantic information associated with physical objects in the physical environment with the sensor data,
wherein the estimate of the external forces and/or external torques acting on the UAV is further based on the semantic information.

21. The UAV of claim 17, further comprising:
a flight controller configured to:
receive a planned trajectory from the navigation system; and
output control commands to the propulsion system to cause the UAV to autonomously fly along the planned trajectory.

22. The UAV of claim 17, further comprising:
a wireless communication interface for communicating wirelessly with a mobile device.

23. The UAV of claim 17, wherein the propulsion system includes:
a plurality of electronic rotor devices;
wherein the sensor device includes a current sensor for sensing an electric current at any one or more of the plurality of electronic rotor devices.

24. The UAV of claim 17, wherein the navigation system is further configured to:
cause the propulsion system to increase thrust to a takeoff level in response to determining that the UAV is no longer supported by the physical surface.

25. The UAV of claim 17, wherein to determine that the UAV is supported by the physical surface, the navigation system is configured to process data indicative of the changes in the estimated external forces and/or external torques using a machine learning model.

26. The UAV of claim 17, wherein to estimate the external forces and/or external torques acting on the UAV, the navigation system is configured to:
at least some of the sensor data into a state observer to estimate a state of the UAV; and
estimate the external forces and/or external torques acting on the UAV based on the estimated state of the UAV.

27. A system for controlling an unmanned aerial vehicle (UAV), the system comprising:
an external force estimation module configured to:
process sensor data received from one or more sensors onboard the UAV to continually estimate external forces and/or external torques acting on the UAV while the UAV is in flight through a physical environment; and
output, and continually update, force data indicative of the estimated external forces and/or external torques acting on the UAV;
a touchdown detection module configured to:
output a first signal in response to determining, by processing the force data using a machine learning model, that the UAV is in contact with a surface in the physical environment; and
output a second signal in response to determining, by processing the force data using the machine learning model, that the UAV is supported by the surface in the physical environment;
a flight controller module configured to:
generate a first control command configured to cause a propulsion system to gradually reduce thrust over a period of time in response to receiving the first signal from the touchdown detection module; and
generate a second control command configured to cause the propulsion system to gradually reduce thrust to zero in response to receiving the second signal from the touchdown detection module.

28. The system of claim 27,
wherein the touchdown detection module is further configured to output a third signal in response to determining, by processing the force data using the machine learning model, that the UAV is no longer supported by the surface in the physical environment; and
wherein the flight controller is further configured to generate a third control command configured to cause the propulsion system to increase thrust to a predetermined takeoff level in response to receiving the third signal from the touchdown detection module.

29. A manned aircraft comprising:
one or more control actuators;
a manual control system configured to:
receive input from a pilot of the manned aircraft; and
responsively adjust the one or more control actuators to maneuver the manned aircraft in accordance with the input;
one or more sensors; and
an automated landing system configured to:
in response to an instruction to land:
initiate an automated landing sequence to autonomously land the manned aircraft on a physical surface in a physical environment;
process perception inputs based on sensor data from the one or more sensors to estimate external forces and/or external torques acting on the manned aircraft while the manned aircraft is descending to land on the physical surface in the physical environment;
determine based on the estimated external forces and/or external torques that the manned aircraft is in contact with the physical surface;

generate a first control command configured to adjust the one or more control actuators to gradually reduce thrust by a propulsion system over a period of time;

monitor changes in the estimated external forces and/or external torques as the thrust is gradually reduced;

determine based on the monitoring that the manned aircraft is supported by the physical surface; and generate a second control command configured to adjust the one or more control actuators to power down a propulsion system in response to determining that the manned aircraft is supported by the physical surface.

30. The manned aircraft of claim 29, wherein to estimate the external forces and/or external torques acting on the UAV, the automated landing system is further configured to:

process semantic information associated with physical objects in the physical environment with the sensor data, wherein the estimate of the external forces and/or external torques acting on the UAV is further based on the semantic information.

31. The manned aircraft of claim 29, wherein the automated landing system comprises:

a motion planner; and a flight controller;

wherein initiating the automated landing sequence to autonomously land the manned aircraft on the physical surface includes generating a behavioral objective to land on the physical surface;

wherein the motion planner is configured to:

process the behavioral objective to generate a planned trajectory; and output the planned trajectory to the flight controller; and wherein the flight controller is configured to generate control commands for adjusting the one or more control actuators to cause the manned aircraft to autonomously maneuver along the planned trajectory to land on the physical surface.

32. The manned aircraft of claim 29, wherein the propulsion system includes:

a plurality of electronic rotor devices; and wherein the one or more sensors include a current sensor for sensing an electric current at any one or more of the plurality of electronic rotor devices.

33. The manned aircraft of claim 29, wherein the navigation system is further configured to:

generate a third control command configured to adjust the one or more control actuators to increase thrust by the propulsion system to a takeoff level in response to determining that the manned aircraft is no longer supported by the physical surface.

34. The manned aircraft of claim 29, wherein determining that the manned aircraft is supported by the physical surface includes processing data indicative of the changes in the estimated external forces and/or external torques using a machine learning model.

35. The manned aircraft of claim 29, wherein the one or more sensors include any of:

an image capture device;

an accelerometer;

a gyroscope;

an inertial measurement unit (IMU); or a current sensor coupled to the propulsion system.

* * * * *

UNITED STATES PATENT AND TRADEMARK OFFICE
CERTIFICATE OF CORRECTION

PATENT NO. : 10,996,683 B2
APPLICATION NO. : 16/272132
DATED : May 4, 2021
INVENTOR(S) : Rowland Wilde O'Flaherty et al.

Page 1 of 1

It is certified that error appears in the above-identified patent and that said Letters Patent is hereby corrected as shown below:

In the Claims

Column 41, Claim 1, Line 21, delete "for"

Column 43, Claim 26, Line 64, before "at" add --input--

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*